United States Patent
Hwang et al.

(10) Patent No.: US 10,544,972 B2
(45) Date of Patent: Jan. 28, 2020

(54) REFRIGERATOR AND CONTROL METHOD THEREFOR

(71) Applicant: LG Electronics Inc., Seoul (KR)

(72) Inventors: Gwinan Hwang, Seoul (KR); Junhyo Koo, Seoul (KR); Sanghyun Song, Seoul (KR); Inguk Lee, Seoul (KR); Taehwan Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 15/573,152

(22) PCT Filed: May 3, 2016

(86) PCT No.: PCT/KR2016/004638
§ 371 (c)(1),
(2) Date: Nov. 10, 2017

(87) PCT Pub. No.: WO2016/182249
PCT Pub. Date: Nov. 17, 2016

(65) Prior Publication Data
US 2018/0106519 A1    Apr. 19, 2018

(30) Foreign Application Priority Data
May 11, 2015  (KR) .................. 10-2015-0065444

(51) Int. Cl.
F25B 49/02   (2006.01)
F25D 29/00   (2006.01)
(Continued)

(52) U.S. Cl.
CPC .......... *F25B 49/022* (2013.01); *F25B 31/026* (2013.01); *F25B 49/025* (2013.01);
(Continued)

(58) Field of Classification Search
CPC .... F25B 31/026; F25B 49/022; F25B 49/025; F25B 2500/19; F25B 2600/01;
(Continued)

(56) References Cited

U.S. PATENT DOCUMENTS 6,220,045 B1   4/2001  Kim
7,765,819 B2   8/2010  Anell et al.
(Continued)

FOREIGN PATENT DOCUMENTS

CN    1800760    7/2006
CN    101755126  6/2010
(Continued)

OTHER PUBLICATIONS

Korean Office Action in Korean Application No. 10-2017-7021967, dated Jun. 29, 2018, 4 pages.
(Continued)

*Primary Examiner* — Marc E Norman
(74) *Attorney, Agent, or Firm* — Fish & Richardson P.C.

(57) ABSTRACT

The present disclosure relates to a refrigerator and a method for controlling the same. The present disclosure provides a method for controlling the same, the method including an initial driving step of driving a compressor according to a rotation per minute (RPM) at which the compressor is driven in a previous cycle, an RPM adjusting step of increasing the RPM when an operation rate is larger than a first setting value, decreasing the RPM when the operation rate is smaller than the second setting value, and maintaining the RPM when the operation rate is between the first setting value and the second setting value, in consideration of the operation rate of the previous cycle, and a driving step of driving the compressor according to the adjusted RPM, wherein the first setting value is larger than the second setting value.

19 Claims, 25 Drawing Sheets

(51) Int. Cl.
*F25B 31/02* (2006.01)
*F25D 11/00* (2006.01)

(52) U.S. Cl.
CPC ............. *F25D 11/00* (2013.01); *F25D 29/00* (2013.01); *F25B 2500/19* (2013.01); *F25B 2600/01* (2013.01); *F25B 2600/0251* (2013.01); *F25B 2600/0253* (2013.01); *F25B 2700/2104* (2013.01); *F25D 2700/12* (2013.01); *Y02B 30/741* (2013.01)

(58) Field of Classification Search
CPC .......... F25B 2600/251; F25B 2600/253; F25B 2700/2104; F25D 2700/12
See application file for complete search history.

(56) References Cited

U.S. PATENT DOCUMENTS

| | | | |
|---|---|---|---|
| 8,011,199 | B1 | 9/2011 | Chen et al. |
| 9,074,787 | B2 * | 7/2015 | Kitagishi ............. F25B 49/025 |
| 2003/0145617 | A1 | 8/2003 | Jung |
| 2005/0204760 | A1 | 9/2005 | Kurita et al. |
| 2012/0216555 | A1 | 8/2012 | Ishii et al. |

FOREIGN PATENT DOCUMENTS

| | | |
|---|---|---|
| CN | 102721257 | 10/2012 |
| CN | 103776234 | 5/2014 |
| CN | 203758164 | 8/2014 |
| CN | 104154703 | 11/2014 |
| EP | 1128143 | 8/2001 |
| EP | 3098547 | 11/2016 |
| GB | 2289962 | 12/1995 |
| JP | 2000205723 | 7/2000 |
| KR | 10-2000-0038802 | 7/2000 |
| KR | 10-2000-0038948 | 7/2000 |
| KR | 10-2000-0055336 | 9/2000 |
| KR | 10-2013-0130517 | 12/2013 |

OTHER PUBLICATIONS

European Search Report in European Appln. No. 16792895.1, dated Jan. 4, 2019, 9 pages.

Chinese Office Action in Chinese Application No. 201680027596.1, dated Jun. 25, 2019, 32 pages (with English translation).

* cited by examiner

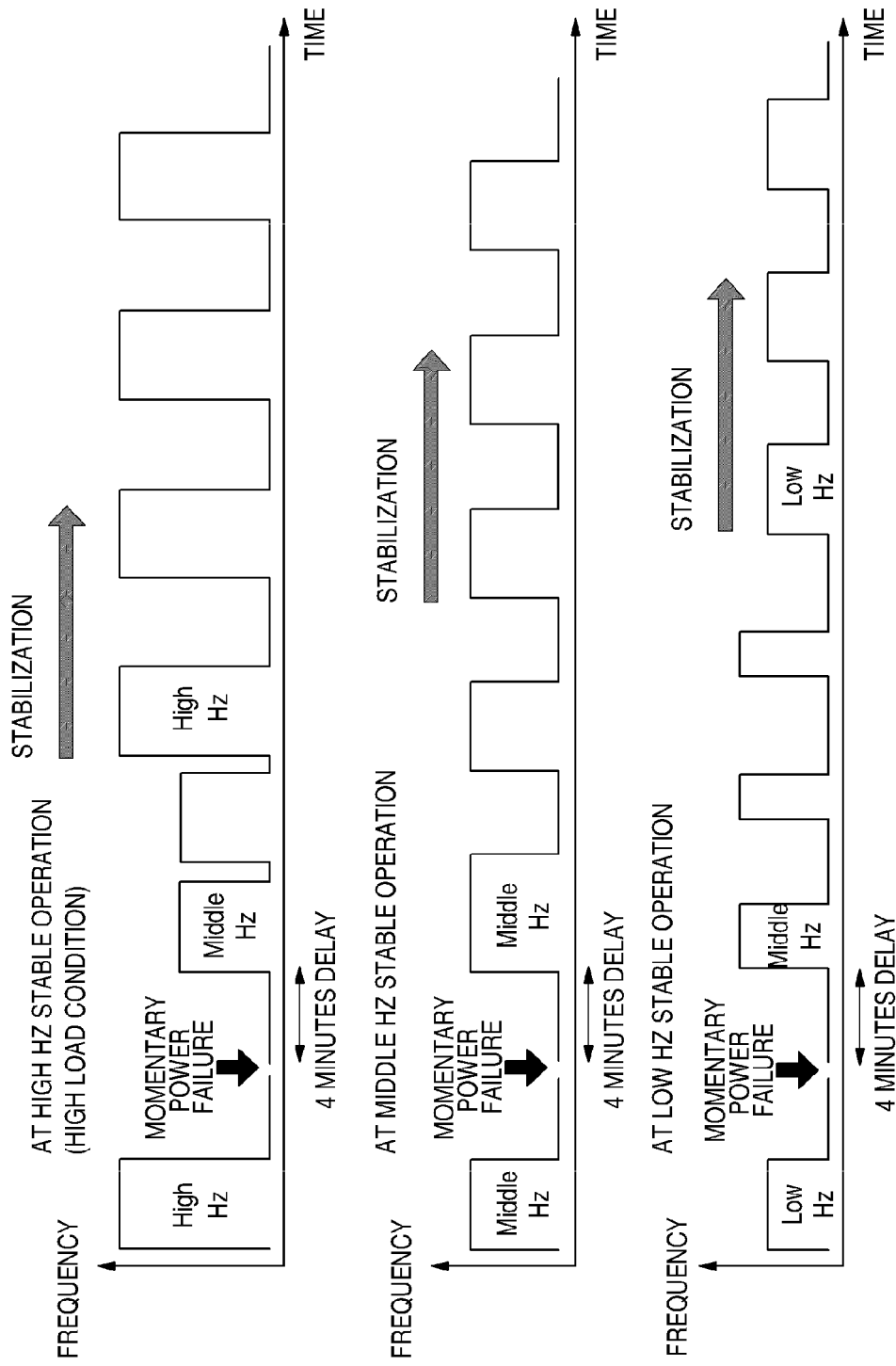

REFRIGERATOR AND CONTROL METHOD THEREFOR

CROSS-REFERENCE TO RELATED APPLICATIONS

This application is a National Stage application under 35 U.S.C. § 371 of International Application No. PCT/KR2016/004638, filed May 3, 2016, which claims the benefit of Korean Application No. 10-2015-0065444, filed on May 11, 2015. The disclosures of the prior applications are incorporated by reference in their entirety.

BACKGROUND

The present disclosure relates to a refrigerator and a method for controlling the same, and more particularly, to a refrigerator which may simply adjust a temperature in the refrigerator, and a method for controlling the same.

In general, a refrigerator is an apparatus which may store food in a fresh state for a predetermined period of time by cooling a storage chamber (a freezing chamber or a refrigerating chamber) while repeatedly performing a refrigeration cycle.

The refrigerator includes a compressor configured to compress a refrigerant circulating in the refrigeration cycle to a high temperature and a high pressure. The refrigerant compressed by the compressor generates cold air while passing through a heat exchanger, and the generated cold air is supplied to the freezing chamber or the refrigerating chamber.

According to a refrigerator according to the related art, a compressor used in the refrigerator may be repeatedly switched on/off according to a temperature in the refrigerator. When the temperature in the refrigerator is not less than a predetermined temperature, the compressor is switched on so that a refrigeration cycle is driven. In contrast, when the temperature in the refrigerator is not more than the predetermined temperature, the compressor may be switched off because it is unnecessary to supply cold air.

A main printed circuit board (PCB), by which information on the temperature in the refrigerator is transferred and thus a related command may be transferred to a compressor controller, should be installed in the refrigerator to control an ON/OFF operation of the compressor. There is a problem in that increased costs are required to install such a main PCB.

In more detail, the existing refrigerator employs a reciprocating compressor, and is configured such that a space in the refrigerator may be maintained in a set temperature range by a thermostat which is switched on/off according to a change in the temperature in the refrigerator.

The refrigerator having such a structure has an advantage in that the refrigerator may be configured using a relatively simple structure and low costs.

However, the refrigerator having such a structure has a problem in that because only an ON/OFF operation may be controlled due to characteristics of the reciprocating compressor, a proper operation control cannot be performed according to a load, and the proper operation control cannot be performed according to a temperature of external air. Further, there is a problem in that because a efficient operation control of the compressor cannot be performed in accordance with a load, power consumption is high.

To solve the above-described problems, a refrigerator, which employs an inverter-type compressor that may perform a variable supply control of a cooling power, and adjusts the cooling power by varying a frequency according to a load in the refrigerator and temperatures measured by a temperature sensor unit including an external air temperature sensor and an internal air temperature sensor, has been developed. In such a refrigerator, a variable operation control of the compressor may be performed in accordance with a load, an operating time of the compressor may be shortened and an interior of the refrigerator may be rapidly cooled, so that power consumption may be reduced.

However, in the refrigerator having such a structure, temperature sensors, a display configured to set the temperature in the refrigerator, and a manipulation unit are additionally required, and a separate main microcomputer configured to control the temperature sensors, the display, and the manipulation unit to adjust a frequency of the compressor according to a load is additionally required. Thus, there is a problem in that because the separate main microcomputer configured to control the temperature sensors, the display, and the like is required in addition to a compressor microcomputer configured to drive the inverter-type compressor, manufacturing costs increase.

Further, when a temperature of external air is high, the frequency of the compressor is controlled to be high by the external air temperature sensor, and the cooling power for cooling the interior of the refrigerator is excessively provided. Thus, there is a problem in that because the compressor is frequently driven, power consumption increases.

SUMMARY

The present disclosure is conceived to solve the above-described problems, and an aspect of the present disclosure is to provide a refrigerator which may adjust a temperature in the refrigerator by controlling a compressor even without a main PCB, that is, a main microcomputer, configured to control the entire refrigerator, and a method for controlling the same.

Further, another aspect of the present disclosure is to provide a refrigerator which may efficiently drive a compressor, and a method for controlling the same.

Further, yet another aspect of the present disclosure is to provide a refrigerator which may provide a simple algorithm for operating a compressor, and a method for controlling the same.

Further, yet another aspect of the present disclosure is to provide a refrigerator in which a thermostat is connected to a compressor PCB configured to control an operation of a compressor, so that the compressor PCB may determine the operation of the compressor based on a signal of the thermostat, and a method for controlling the same.

Further, yet another aspect of the present disclosure is to provide a refrigerator which may perform an efficient operation by increasing/decreasing a frequency of a compressor in the next cycle, based on an operation rate of the previous cycle, and a method for controlling the same.

Further, yet another aspect of the present disclosure is to provide a refrigerator in which a compressor is operated at a middle speed in an initial operation so that an interior of the refrigerator may be rapidly cooled and cooling efficiency may be improved, and a method for controlling the same.

To achieve the above-described aspects, provided is a method for controlling a refrigerator. The method may include an initial driving step of driving a compressor according to a rotation per minute (RPM) at which the compressor is driven in a previous cycle, an RPM adjusting step of increasing the RPM when an operation rate is larger than a first setting value, decreasing the RPM when the operation rate is smaller than the second setting value, and maintaining the RPM when the operation rate is between the first setting value and the second setting value, in consideration of the operation rate of the previous cycle, and a driving step of driving the compressor according to the adjusted RPM, wherein the first setting value is larger than the second setting value.

In the driving step, the compressor may be driven until a storage chamber arrives at a set temperature, and when the storage chamber arrives at the set temperature, the driving of the compressor may be stopped.

The method may further include an operation rate calculating step of calculating an operation rate of a performed cycle.

The operation rate calculating step may be performed at the same time as or after the initial driving step.

The operation rate may be obtained by dividing a time for which the compressor is driven in one cycle by the entire time of the one cycle.

The operation rate may be obtained by dividing a time for which the compressor is driven in a plurality of cycles by the entire time of the plurality of cycles.

When a temperature measured by a temperature sensor configured to measure a temperature of the storage chamber departs from a set temperature, the compressor may be driven.

The driving step may further include an additional RPM adjusting step of increasing the RPM when a set time elapses.

The RPM at which the compressor is driven in the previous cycle may be an RPM at which the compressor is finally driven before being stopped.

The compressor may be driven at a low-speed RPM that has a relatively low speed, at a high-speed RPM that has a relatively high speed, or at a middle-speed RPM that is between the low-speed RPM and the high-speed RPM.

The one cycle may mean a period from a time point at which the compressor starts to be driven to a time point at which the compressor is stopped and then restarts to be driven.

Further, provided is a refrigerator. The refrigerator may include a driving unit configured to compress a refrigerant, a compressor controller configured to operate the driving unit according to a set RPM to generate a cooling power, a temperature sensor configured to measure a temperature of a storage chamber, and a storage unit configure to store an RPM at which a compressor is driven in a previous cycle, wherein the compressor controller increases the RPM when an operation rate of the previous cycle is larger than a first setting value, decreases the RPM when the operation rate is smaller than a second setting value, and maintains the RPM when the operation rate is between the first setting value and the second setting value, in consideration of the operation rate of the previous cycle, and the first setting value is larger than the second setting value.

The refrigerator may further include a timer configured to measure an elapse of time, wherein the compressor controller calculates an operation rate of a performed cycle.

The compressor controller may calculate the operation rate at the same time as or after a time point at which the driving unit is driven.

The operation rate may be obtained by dividing a time for which the driving unit is driven in one cycle, by the entire time of the one cycle.

the operation rate may be obtained by diving a time for which the driving unit is driven in a plurality of cycles, by the entire time of the plurality of cycle.

The one cycle may mean a period from a time point at which the driving unit starts to be driven to a time point at which the driving unit is stopped and then restarts to be driven.

The compressor controller may drive the driving unit until the storage chamber arrives at a set temperature, and stop the driving of the driving unit when the storage chamber arrives at the set temperature.

Further, provided is a refrigerator. The refrigerator may include an inverter-type compressor configured to variably adjust an RPM by adjusting a frequency, an evaporator in which a refrigerant compressed by the compressor is condensed and expanded, is then supplied to the evaporator, and is heat-exchanged with air in the refrigerator, a thermostat mounted on one side of the evaporator, a compressor PCB configured to control driving of the compressor, wherein the compressor PCB is connected to the thermostat to directly receive an ON/OFF signal of the thermostat to determine the driving of the compressor, integrates and stores a driving time and a stop time of the compressor to calculate an operation rate, and adjusts a frequency of the compressor based on the calculated operation rate.

The compressor PCB may include a thermostat recognition unit connected to the thermostat to receive an ON/OFF signal of the thermostat, and a microcomputer connected to the thermostat recognition unit to calculate the operation rate so as to determine the driving of the compressor.

The thermostat recognition unit may include a pulse conversion circuit connected to the thermostat to convert a sinusoidal signal of the thermostat into a pulse signal when the thermostat is switched on.

The thermostat recognition unit may include a photo coupler connected to the thermostat to transfer the ON/OFF signal of the thermostat to the microcomputer in an insulated state.

The microcomputer may reset the operation rate when the refrigerator is switched off and electric power is then supplied to the refrigerator, and supply a middle frequency signal to the compressor to allow the compressor to be operated at a middle speed.

The microcomputer may perform a control such that the frequency of the compressor is maintained to be equal to a frequency of a previous cycle or is increased/decreased from the frequency of the previous cycle in stages, based on the operation rate.

The microcomputer may maintain the frequency of the compressor to be equal to a frequency of a previous cycle when the operation rate is within a set range, and may increase/decrease the frequency of the compressor by one stage as compare with the frequency of the previous cycle, when the operation rate is not less than or not more than the set range.

The microcomputer may control the compressor to be operated in any one of a high speed operation in which the frequency of the compressor is highest, a low speed operation in which the frequency of the compressor is lowest, and a middle speed operation in which the frequency of the compressor is between the frequency of the high speed operation and the frequency of the low speed operation.

The operation rate may be obtained by dividing an integrated time of an operation time and a stop time of the compressor in previous two cycles by the operation time of the compressor.

The microcomputer may increase the frequency of the compressor which is being operated by one stage, when a time for which the compressor is continuously operated exceeds a set time.

The evaporator, which is a roll-bond-type evaporator, may be formed to define an accommodation space for food therein.

The refrigerator may further include a body defining a storage space opened/closed by a door, wherein the evaporator is arranged on an upper side of the storage space, an interior of the evaporator defines a freezing chamber, and an exterior of the evaporator defines a refrigerating chamber.

The thermostat may be mounted on a lower surface of the evaporator.

A manipulation member connected to the thermostat to adjust an ON/OFF distance of the thermostat to adjust cooling power of an interior of the refrigerator may be further provided in the body.

The compressor PCB may be configured by a single substrate, wherein the substrate includes a noise filter configured to remove noise in input electric power, a power supply unit configured to convert input alternating current (AC) electric power into direct current (DC) electric power and supply the DC electric power, a compressor operation unit configured to supply electric power and a signal for inverter driving to the compressor, and a thermostat recognition unit configured to transfer the ON/OFF signal of the thermostat to the compressor operation unit, all of which are arranged thereon.

The compressor PCB may be mounted on a machine room in which the compressor is provided.

Further, provided is a method for controlling a refrigerator, in which a speed of a compressor varies according to whether a thermostat provided in the refrigerator is switched on/off, wherein an operation rate of the compressor is calculated using an operation time and a stop time of the compressor, which are integrated in a compressor PCB, and an operation frequency of the compressor in a next cycle is made to be equal to a frequency in a previous cycle or is increased/decreased from the frequency in the previous cycle, based on the calculated operation rate.

The operation rate may be calculated by dividing, by the operation time of the compressor, an entire integrated time of the operation time and the stop time of the compressor in a plurality of previous cycles.

In the compressor, when the operation rate is within a set range, the frequency of the compressor may be maintained to be equal to a frequency of a previous cycle, and when the operation rate is not less than or not more than the set range, the frequency of the compressor may be increased/decreased from the frequency of the previous cycle by one stage.

The compressor may be operated in any one of a high speed operation in which the compressor is operated at the highest frequency, a low speed operation in which the compressor is operated at the lowest frequency, and a middle speed operation in which the compressor is operated at a frequency between the frequency of the high speed operation and the frequency of the low speed operation.

The compressor may be operated in the middle speed operation when being initially operated.

When being operated in the middle speed operation, the compressor may be operated in the low speed operation when the operation rate is not more than a first setting operation rate, may be operated in the high speed operation when the operation rate is not less than a second setting operation rate, and may be maintained in the middle speed operation when the operation rate is between the first setting operation rate and the second setting operation rate.

When being operated in the low speed operation. The compressor may be operated in the middle speed operation when the operation rate is not less than a third setting operation rate, and may be maintained in the low speed operation when the operation rate is smaller than the third setting operation rate.

When being operated in the high speed operation, the compressor may be operated in the middle speed operation when the operation rate is not more than a fourth setting operation rate, and may be maintained in the high speed operation when the operation rate is larger than the fourth setting operation rate.

The third setting operation rate may be larger than the second setting operation rate.

The first setting operation rate and the fourth setting operation rate may be 40%, the second setting operation rate may be 70%, and the third setting operation rate may be 80%.

When the compressor operated in the low speed operation or the middle speed operation is continuously operated for a set period of time within one cycle, the frequency of the compressor being operated may be increased to a next operation stage.

When electric power is resupplied to the refrigerator after the refrigerator is switched off, the operation rate may be reset, and the compressor may be operated in the middle speed operation.

The compressor may be maintained in an OFF state for a predetermined period of time before the initial middle speed operation, and may be then operated.

The initial middle speed operation may be continuously performed for a first setting time.

When the compressor operated in the low speed operation or the middle speed operation is continuously operated for a second setting time within one cycle, the frequency of the compressor being operated may be increased to a next operation stage, and the second setting time may be longer than the second setting time.

The first setting time may be 20 minutes.

The initial middle speed operation may be an operation after power failure.

The thermostat may be attached to the evaporator, and may be directly connected to the compressor PCB to provide a signal for determining an ON/OFF state of the compressor.

According to the present disclosure, the temperature in a refrigerator may be controlled only using a compressor microcomputer without a main microcomputer, so that manufacturing costs may be reduced.

Further, according to the present disclosure, a compressor is efficiently driven, so that energy efficiency may be improved.

Further, according to the present disclosure, the compressor is set to be operated at an RPM, at which the compressor is driven in a previous cycle, in an initial operation before an operation rate is calculated, so that an algorithm for the initial operation of the compressor may be simple.

Further, according to the present disclosure, a thermostat is directly connected to a compressor PCB configured to control an operation of the compressor, so that the compressor PCB may control the compressor using the thermostat without a separate configuration for communication. Thus, manufacturing costs may be reduced, and an efficient and reliable frequency-variable control of the compressor may be performed.

Further, because the frequency of the compressor in a next cycle is maintained or increased/decreased based on the operation rate of the previous cycle, the compressor may be instantly operated at the most efficient operation speed based on the previous cooling power, so that power consumption may be improved, and cooling performance may be improved.

Further, there is an advantage in that because the compressor is operated at a middle speed in the initial operation, a time for which the compressor enters a high speed operation may be reduced, and a frequent ON/OFF operation of the compressor in the high speed operation may be prevented by sufficiently cooling the interior of the refrigerator before the high speed operation, so that power consumption may be improved and initial cooling of the interior of the refrigerator may be rapidly performed as well.

BRIEF DESCRIPTION OF THE DRAWINGS

Embodiments will be described in detail with reference to the following drawings in which like reference numerals refer to like elements, and wherein:

FIG. 15 is a view illustrating the state of the thermostat recognition unit and the signal supply state of the microcomputer when the thermostat is switched on;

FIG. 25 is a graph depicting a change in a frequency when the compressor according to another embodiment of the present disclosure is operated at power recovery.

DETAILED DESCRIPTION OF THE EMBODIMENTS

Figure 1:
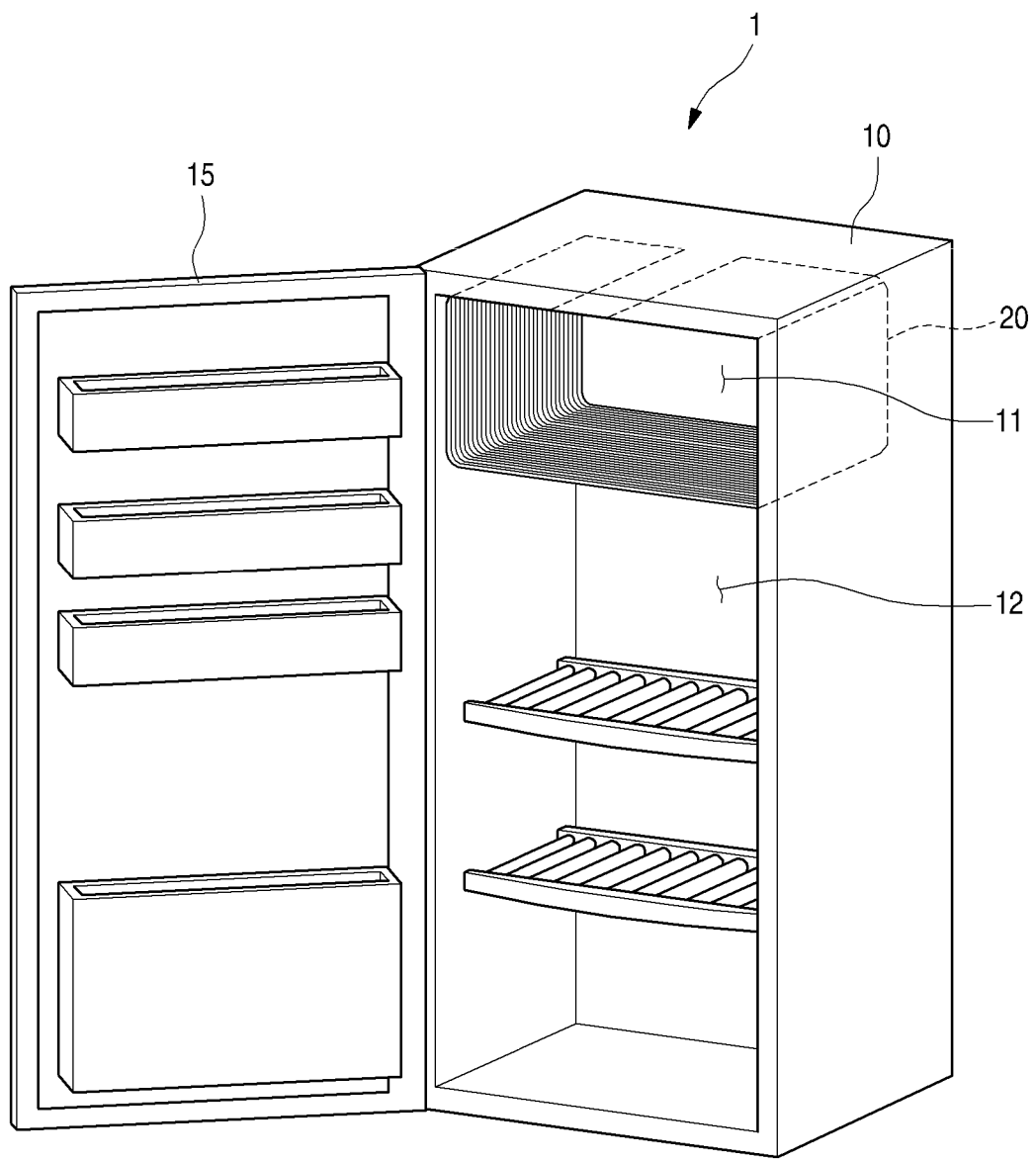
FIG. 1 is a view illustrating a refrigerator to which the present disclosure may be applied.

Hereinafter, exemplary embodiments of the present disclosure, which may implement the aspects of the present disclosure in detail, will be described with reference to the accompanying drawings.

In this process, the sizes or the shapes of components illustrated in the drawings may be excessively illustrated for clarity and convenience of description. Further, terms particularly defined in consideration of the configuration and operation of the present disclosure may change depending on the intention or custom of a user and an operator. The definitions of the terms should be based on the content of the present specification.

FIG. 1 is a perspective view illustrating a refrigerator 1 to which the present disclosure may be applied, and a refrigerator body 10, an evaporator 20, and a door 15 are illustrated in FIG. 1.

That is, the present disclosure may be applied even to a refrigerator having a simple structure, in which a freezing chamber and a refrigerating chamber are not distinguished from each other by doors, as illustrated in FIG. 1. A technology of controlling a refrigerator using only a compressor microcomputer without a microcomputer configured to control the entire refrigerator is disclosed in the present disclosure.

The refrigerator 1 may have a storage chamber therein and maintain the temperature of the storage chamber constant using a refrigeration cycle, making it possible to store perishable food.

The refrigerator 1 includes a refrigerator body 10 having opened one side and having the storage chamber formed therein, and a door 15 configured to open/close an opening of the refrigerator body 10.

The refrigerator body 10 has the storage chamber having an opened front surface and configured to store food therein. The entire refrigerator body 10 is configured by one space, and thus may be also maintained at a uniform temperature. However, the refrigerator 1 generally used in the home may be divided into a freezing chamber 11, an internal temperature of which is maintained at 0 degree or less, and a refrigerating chamber 12 which is maintained at a temperature (for example, about 10 degrees) that is higher than 0 degree and is lower than the room temperature.

As illustrated in FIG. 1, the number of the door 15 may be only one, or may be two or more as needed. As the size of the refrigerator 1 increases and the use of the refrigerator 1 is diversified, the number of the doors 15 tends to increase more and more.

When a drawer-type storage chamber which is received in, inserted into, and withdrawn from the refrigerator body 10 other than a hinged door which is opened/closed through rotation about a hinge is provided, the door 15 may be opened/closed by pushing and pulling the door 15. The number of the doors 15 may be variously configured depending on the number of partitioned spaces in the refrigerator body 10.

The evaporator 20, which is a portion of the refrigeration cycle, is arranged in the storage chamber to supply cold air to the storage chamber. The refrigeration cycle has a condenser and a compressor in addition to the evaporator 20, and a refrigerant is heat-exchanged while circulating in the evaporator 20, the condenser, and the compressor, to maintain the temperature of the storage chamber constant.

The refrigerant is liquefied by the condenser and the compressor, and absorbs heat around the refrigerant while being evaporated by the evaporator 20, to decrease the temperature of the storage chamber. That is, because the evaporator 20 is a part that is heat-exchanged with the inside of the storage chamber, an uneven portion is formed on the surface of the evaporator 20 to increase heat exchange efficiency. The surface of the evaporator 20 illustrated in FIG. 1 is also uneven to increase a surface area of the evaporator 20.

Figure 2:
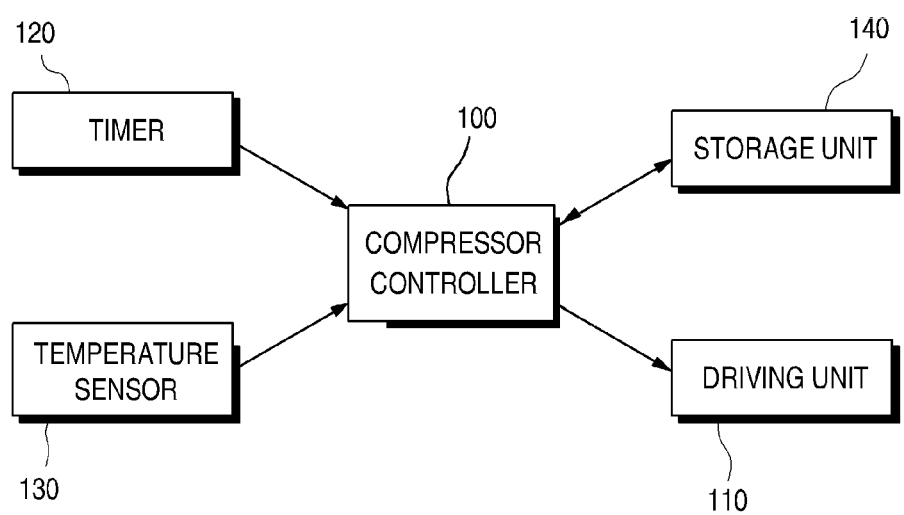
FIG. 2 is a control block diagram according to an embodiment of the present disclosure.

FIG. 2 is a control block diagram according to an embodiment of the present disclosure.

Referring to FIG. 2, in the embodiment of the present disclosure, the compressor may include a compressor controller 100 and a driving unit 110 driven by the compressor controller 100.

The driving unit 110 may compress a lubricant or the refrigerant included in the refrigeration cycle while being rotated at an RPM that is set according to a driving command of the compressor controller 100. That is, when the driving unit 110 is driven, cooling power may be generated as an interior of the compressor is lubricated and the compressor compresses the refrigerant.

The compressor controller 100 determines an RPM at which the driving unit 110, that is, the compressor, may be driven, and drives the driving unit 110, that is, the compressor, at the corresponding RPM. When the compressor controller 100 drives the compressor at a relatively high RPM, a relatively high cooling power may be generated. On the other hand, when the compressor controller 100 drives the compressor at a relatively low RPM, a relatively low cooling power may be generated.

Meanwhile, the compressor controller 100 may set an RPM of the driving unit 110, that is, the compressor, and the RPM at which the driving unit 110 is driven may be stored in a storage unit 140. Here, the RPM stored in the storage unit 140 may be an RPM of the driving unit 110, that is, the compressor, in a previous cycle. The RPM stored in the storage unit 140 may be an RPM in the previous cycle, in a cycle before the previous cycle, or in a cycle earlier than the previous cycle by several cycles.

The compressor may further include a timer 120 configured to measure a time for which the driving unit 110, that is the compressor, is driven. The timer 120 may measure a time period from a time point at which the compressor is driven to a time point at which the compressor is driven again, that is, a time period consumed in one cycle.

Further, the timer 120 may measure also a time for which the driving unit 110, that is, the compressor, is driven in one cycle, and thus may be used to calculate an operation rate of the compressor.

Further, the compressor may include a temperature sensor 130 configured to measure the temperature of the storage chamber.

When the temperature measured by the temperature sensor 130 arrives at a set temperature, the compressor controller 100 may stop the driving unit 110. On the other hand, when the temperature measured by the temperature sensor 130 does not arrive at the set temperature or departs from the set temperature, the compressor controller 100 may drive the driving unit 110.

For example, when the temperature sensor 130 is a thermostat, the thermostat may open/close a circuit configured to supply a current to the driving unit 110.

In this case, when the temperature of the storage chamber is not lowered to the set temperature, the thermostat may be closed. Because the thermostat is closed and the current is supplied to the driving unit 110, the driving unit 110 may be driven.

On the other hand, when the temperature of the storage chamber is lowered to the set temperature, the thermostat may be opened. Because the thermostat is opened and the current is supplied to the driving unit 110, driving of the driving unit 110 may be stopped.

Figure 3:
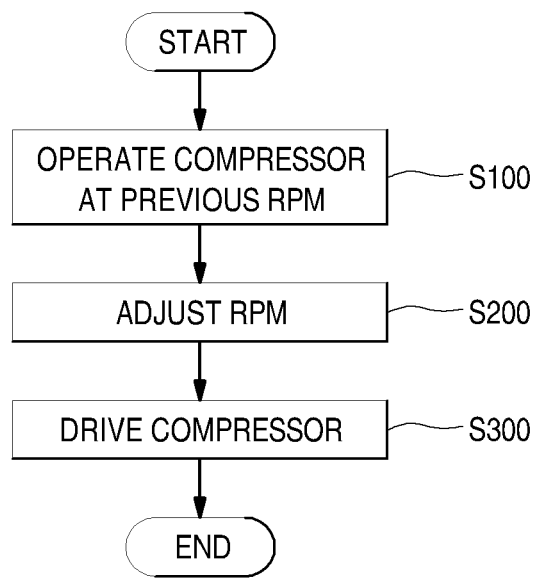
FIG. 3 is a control flowchart according to the embodiment of the present disclosure.

FIG. 3 is a control flowchart according to the embodiment of the present disclosure.

Referring to FIG. 3, when the temperature sensor 130 detects that the temperature of the storage chamber is higher than the set temperature, the compressor, specifically, the driving unit 110 is driven (S100).

Here, the compressor may be operated at an RPM of the compressor driven in the previous cycle, which is stored in the storage unit 140.

Meanwhile, when a specific condition is satisfied, the RPM is adjusted (S200).

For example, the RPM at which the compressor is operated may increase to be larger than a previous RPM, may become equal to the previous RPM, or may decrease to be smaller than the previous RPM.

The driving unit 110 is driven according to the adjusted RPM (S300).

Here, as the driving unit 110 is consistently driven according to the adjusted RPM, the temperature of the storage unit may be lowered to the set temperature.

Of course, the operation RPM of the compressor may change later depending on an additional condition.

When the temperature of the storage chamber is lowered down to the set temperature, the driving of the compressor is stopped, and cold air is not additionally supplied, so that energy is not consumed.

Figure 4:
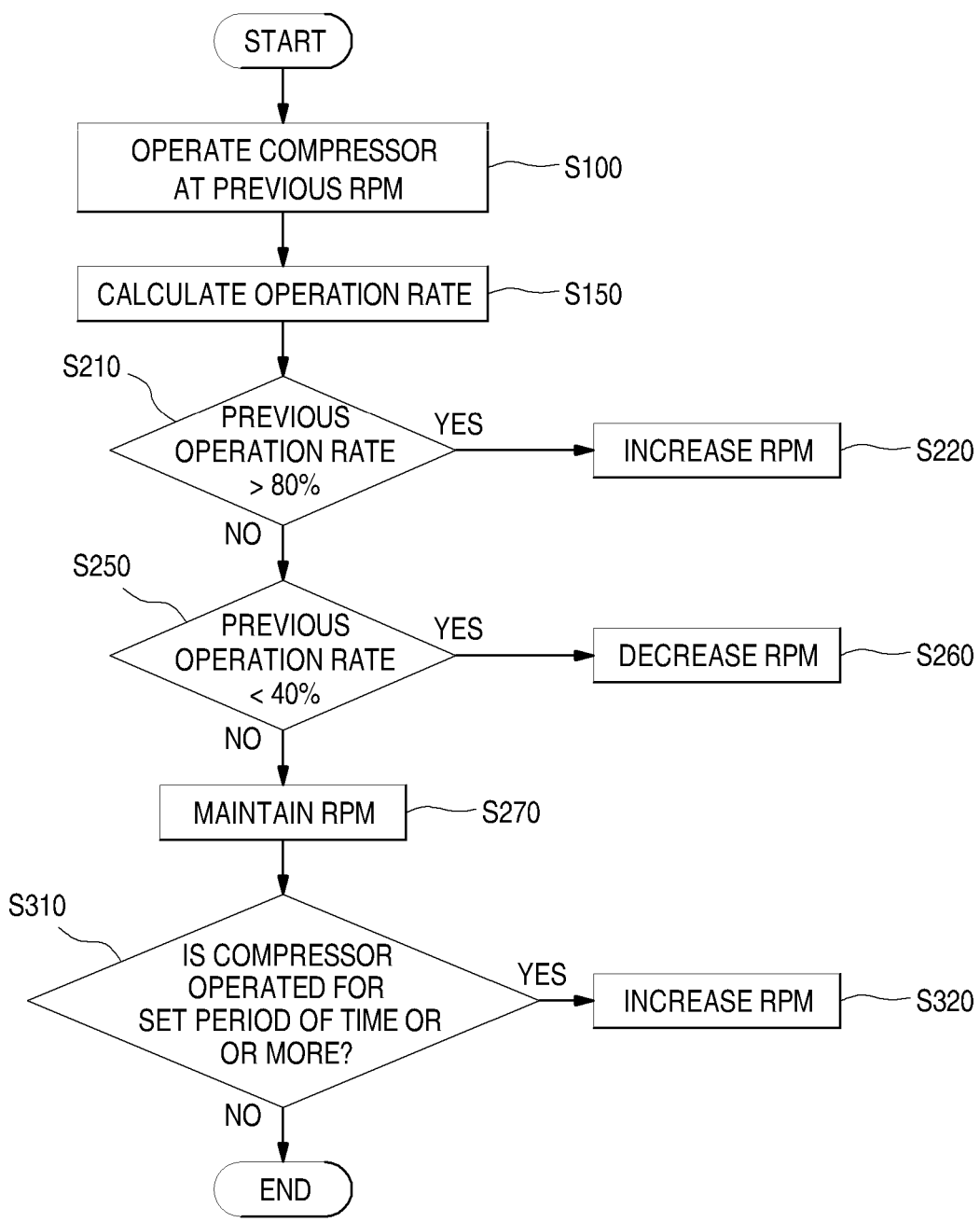
FIG. 4 is a view for explaining FIG. 3 in detail.
Figure 5:
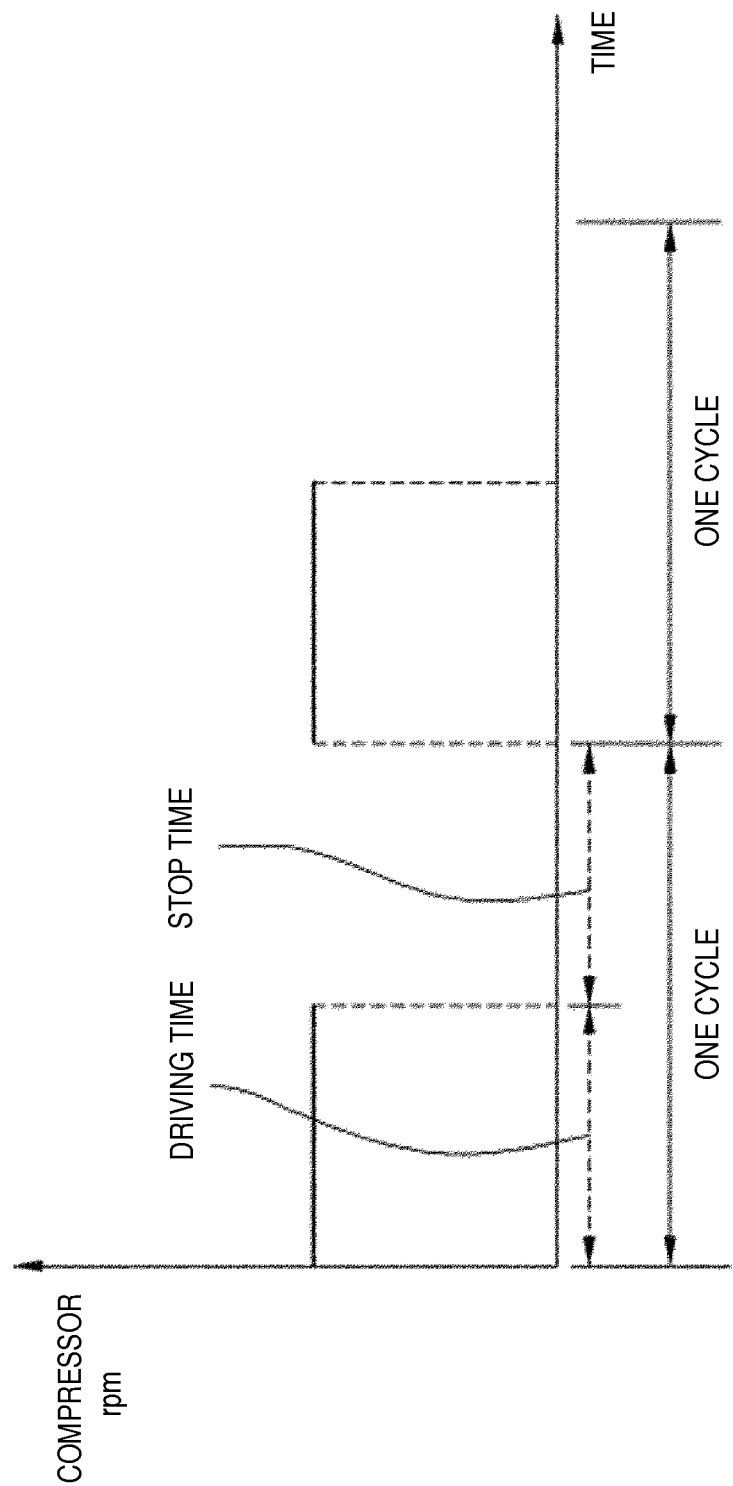
FIG. 5 is a view for explaining an operation rate.
Figure 6A:
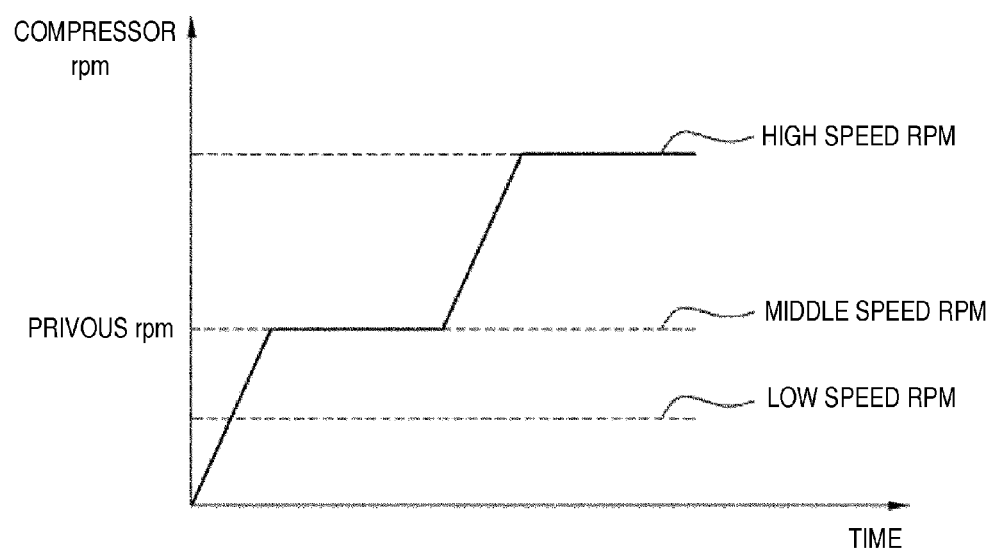
FIG. 6A is a view illustrating an implementation example according to the embodiment of the present disclosure.
Figure 6B:
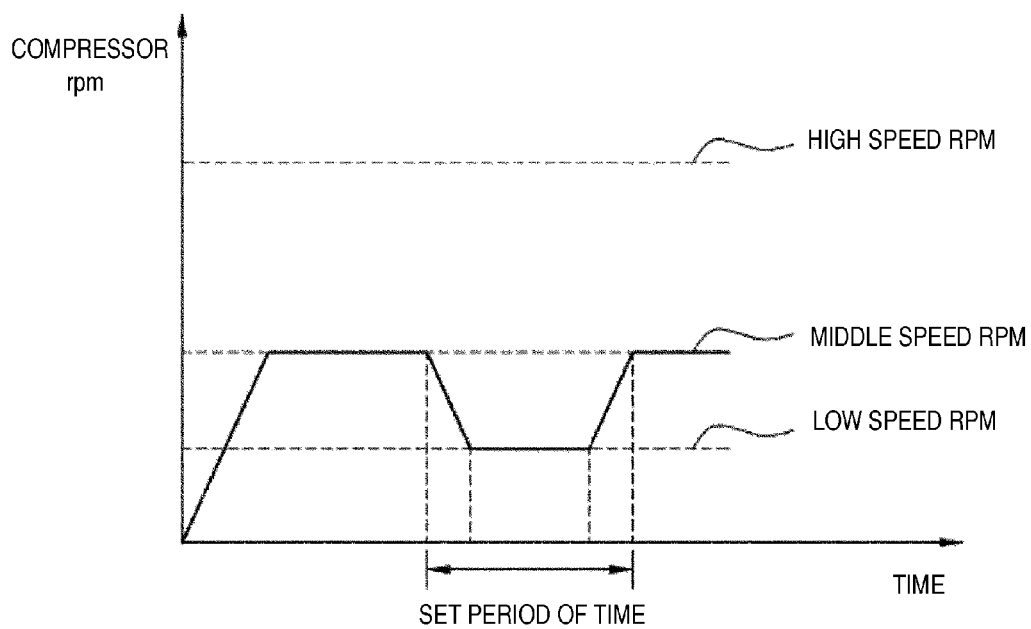
FIG. 6B is a view illustrating another implementation example according to the embodiment of the present disclosure.

FIG. 4 is a view for explaining FIG. 3 in detail, FIG. 5 is a view for explaining an operation rate, FIG. 6A is a view illustrating an implementation example according to the embodiment of the present disclosure, and FIG. 6B is a view illustrating another implementation example according to the embodiment of the present disclosure.

Referring to FIG. 4 to FIG. 6B, when the temperature of the storage chamber, which is detected by the temperature sensor 130, is increased to the set temperature or higher, the driving unit 110 is driven at the RPM at which the driving unit 110 has been rotated previously (S100). That is, the compressor may be driven at the RPM which is used in the previous cycle.

Here, the RPM stored in the storage unit 140 may be used as the previous RPM.

In this case, as illustrated in FIG. 6A, because the compressor is driven at the previous RPM after being not operated, the compressor may be driven while the RPM of the compressor increases for a predetermined period of time, and then arrives at the previous RPM.

Meanwhile, when the compressor starts to be operated, that is, when the driving unit 110 starts to rotate, the operation rate is calculated (S150).

As the time elapses, the compressor is operated to place the temperature of the storage chamber within a set temperature range. In this case, when the temperature of the storage chamber is within the set temperature range, the operating of the compressor is stopped, and when the temperature of the storage chamber departs from the set temperature range, the compressor is operated.

As illustrated in FIG. 5, as the time elapses, the temperature of the storage chamber may be within the set temperature range, that is, may decrease to be lower than the set temperature, as the compressor is repeatedly driven or stopped.

Such a cycle refers to one cycle, and the one cycle include a driving time for which the compressor is driven and a stop time for which the compressor is not driven. Because the cold air is supplied while the compressor is driven, the temperature of the storage chamber may be lowered.

The operation rate may be calculated by dividing the time for which the compressor is driven by the entire time of the one cycle. For example, the entire time of the one cycle may mean a time period from a time point at which the compressor starts to be operated to a time point at which the compressor starts to be operated again after the compressor is stopped for a predetermined period of time. The operation rate may mean a ratio obtained by dividing, by the entire time of the one cycle, the time for which the compressor is operated, that is, a time for which the cold air is supplied while the driving unit 110 is rotated to compress the refrigerant.

Of course, the operation rate may be calculated by dividing a time for which the compressor is driven within a plurality of cycles by the entire time of the plurality of cycles. That is, as illustrated in FIG. 5, the operation rate may be calculated using a ratio of a time for which the compressor is operated in two cycles to the entire time of the two cycles.

When the operation rate is calculated using the plurality of cycles, the compressor is prevented from being operated in accordance with a specific situation of an immediately previous cycle in a state in which the specific situation is reflected, as compared to a case where the operation rate is calculated using one cycle.

The operation rate may be calculated only when a time, at which the compressor restarts to be operated after the compressor starts to be operated and is then stopped, should elapse. This is because the entire time of the one cycle may be measured only when the corresponding time elapses.

Thus, in operation S150, the operation rate may be calculated at a time point at which operation S100 and operation S150 are simultaneously performed, that is, at a time point at which the compressor starts to be operated at the previous RPM. Further, in operation S150, the operation rate may be calculated after a time point which is performed after operation S100, that is, at which the compressor starts to be operated at the previous RPM, elapses.

Because operation S150 is performed at the same time as that of operation S100 or after operation S100, an RPM at which the compressor has been operated in the previous cycle may be selected as an RPM at which the compressor is to be initially operated. Thus, the present disclosure has an advantage in that because the RPM at which the compressor is to be operated may be relatively easily selected, an algorithm for implementing the present disclosure is relatively simple, so that the temperature of the refrigerator may be simply adjusted.

Further, as in operation S200 of FIG. 3, the RPM of the compressor may be adjusted.

The RPM of the driving unit 110 may be adjusted according to the operation rate performed in the previous cycle using operation S150.

When the previous operation rate is larger than a first setting value, for example, 80%, the RPM may increase (S210, S220). As illustrated in FIG. 6A, when the compressor is operated at a middle speed RPM in an initial driving step in which the compressor is initially operated, the RPM may increase to a high speed RPM.

When the previous operation rate is larger than the first setting value, it is identified that the compressor is operated for a longer time than that of a design condition, and thus it is preferable that the RPM is adjusted such that the compressor is operated for a shorter time. Thus, the RPM of the compressor increases, but a time for which the compressor is driven is reduced, so that energy efficiency may be improved.

Meanwhile, when the previous operation rate is smaller than a second setting value, for example, 40%, the RPM may decrease (S250, S260). Although not illustrated in FIG. 6A, when the compressor is driven at the middle speed RPM in the initial driving step in which the compressor is initially operated, the RPM may decrease to a low speed RPM.

When the previous operation rate is smaller than the second setting value, it is identified that the compressor is operated for a shorter time than that of the design condition, and thus it is preferable that the RPM is adjusted such that the compressor is operated for a longer time. Thus, the RPM of the compressor decreases, but a time for which the compressor is driven increases, so that energy efficiency may be improved.

Meanwhile, when the previous operation rate is in a range between the first setting value and the second setting value, that is, is larger than 40% and is smaller than 80%, the previous RPM may be maintained (S270). Although not illustrated in FIG. 6A, when the compressor is driven at the middle speed RPM in the initial driving step in which the compressor is initially operated, the compressor may be continuously driven at the middle speed RPM.

This is because it is analyzed that energy is efficiently consumed as it is determined that the compressor is driven for a proper time at a proper load because the previous operation rate is within a range of the design condition.

Although the first setting value and the second setting value may variously change according to types of the refrigerator or types of the compressor, it is preferable that the first setting value is larger than the second setting value.

Meanwhile, the compressor is operated not at the previous RPM which is an initial RPM but at an RPM which changes according to conditions through operations S210 to S270. The initial RPM is merely an RPM at which the compressor is initially driven, and the adjusted RPM is actually used to supply the cold air to cool the storage chamber.

Further, even when the compressor is driven at the adjusted RPM, if the compressor is operated such that a set time elapses, the RPM of the compressor increases (S310, S320). That is, it is preferable that when the compressor is operated for a longer time than that of the design condition, the RPM of the compressor increases and thus a time for which the compressor is operated decreases, so that energy efficiency is improved.

Referring to FIG. 6B, first, the compressor may be operated at the middle speed RPM which is the previous RPM. When the compressor is previously operated at the low speed RPM, the previous RPM is not the middle speed RPM but the low speed RPM.

Further, when the operation rate is lower than the second setting value, the compressor is operated at the low speed RPM that is a smaller RPM than the middle speed RPM. That is, the driving unit 110 of the compressor may be driven at the adjusted RPM changed from the previous RPM, to supply the cold air.

However, it is preferable that when the compressor is operated for a set time or more, the compressor is driven at the middle speed RPM that is higher than the low speed RPM corresponding to the adjusted RPM. This is because in a current cycle, the cold air is supplied while the compressor is driven at the adjusted RPM, and thus it is determined that the temperature does not decrease at a sufficient speed.

Meanwhile, the above-described previous RPM may mean a final RPM at which the compressor is driven to supply the refrigerant. That is, the operation RPM of the compressor may change in the one cycle. Initially, the compressor may start to be driven at the initial RPM, and the RPM of the compressor may be adjusted according to the operation rate. Further, even when the compressor is operated at the adjusted RPM, if the compressor is operated for the set time or more, the RPM of the compressor may be additionally adjusted Among the various RPMs in the one cycle, the previous RPM described in operation S100 and the like may mean the adjusted RPM of the compressor. When there is an additionally-adjusted RPM, the previous RPM may mean the additionally-adjusted RPM. That is, the RPM of the compressor driven at the previous cycle may be an RPM that is set such that the compressor is finally driven before being stopped.

The present disclosure is not limited to the above-described embodiments, and may be modified by those skilled in the art to which the present disclosure pertains as can be seen in the appended claims. Further, such modifications belong to the scope of the present disclosure.

Hereinafter, another embodiment of the present disclosure will be described with reference to the accompanying drawings.

Figure 7:
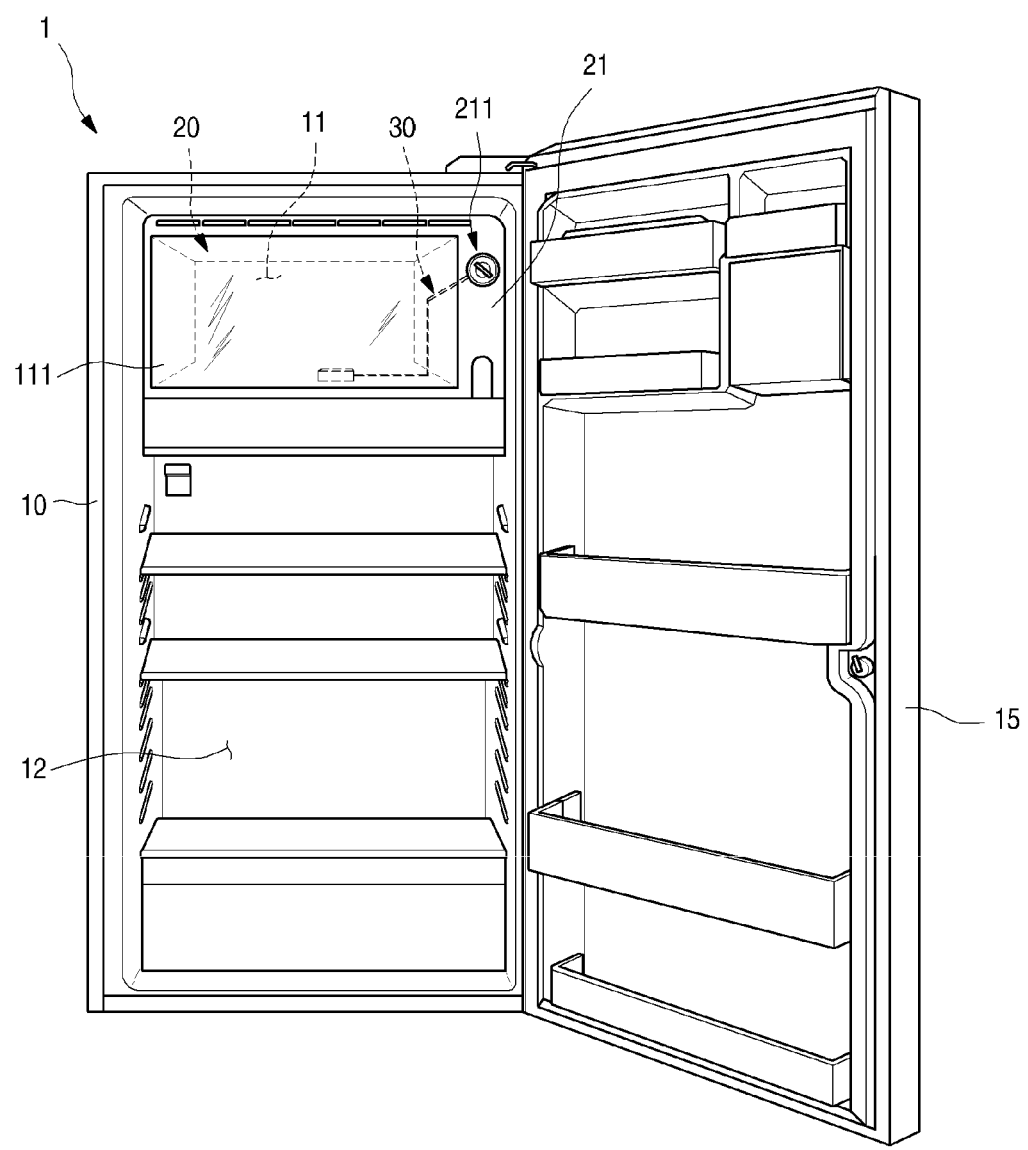
FIG. 7 is a perspective view illustrating a state in which a door of a refrigerator according to another embodiment of the present disclosure is opened.
Figure 8:
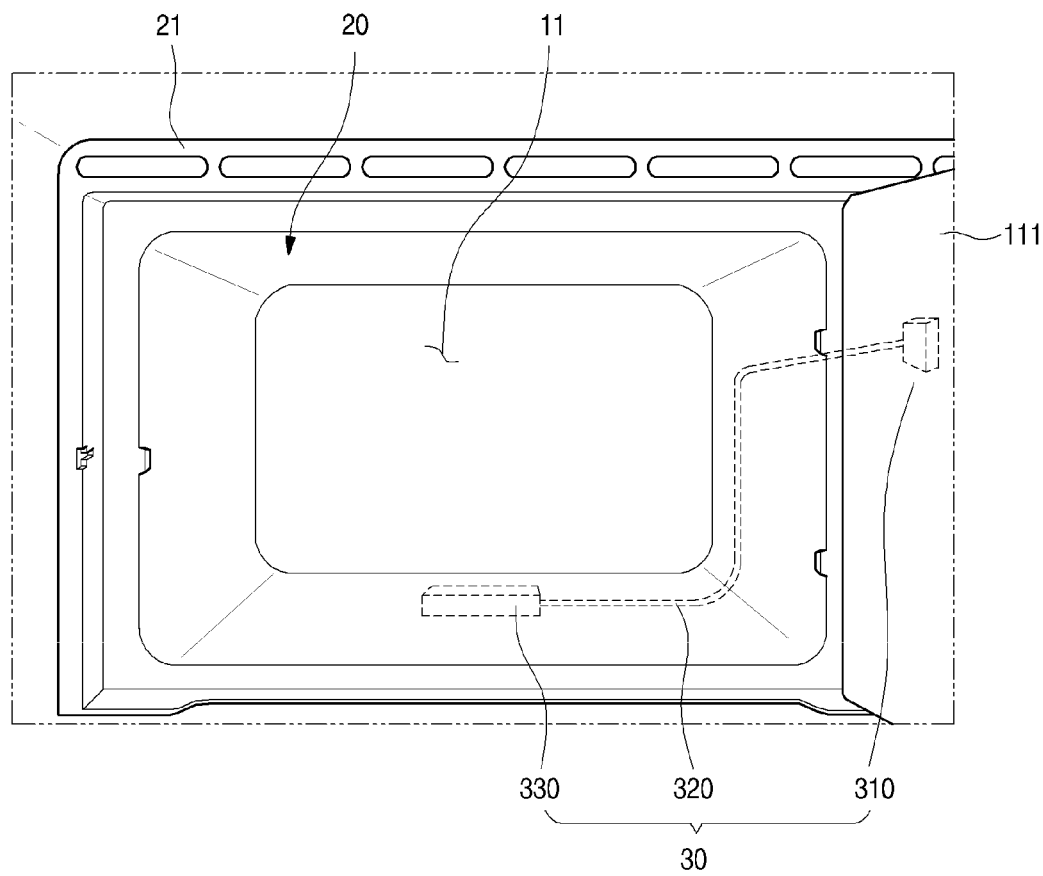
FIG. 8 is a partial perspective view illustrating an interior of a freezing chamber according to another embodiment of the present disclosure.

FIG. 7 is a perspective view illustrating a state in which a door of a refrigerator according to another embodiment of the present disclosure is opened. Further, FIG. 8 is a partial perspective view illustrating an interior of a freezing chamber according to another embodiment of the present disclosure.

As illustrated in the drawings, a refrigerator 1 according to another embodiment of the present disclosure may include a body 10 defining a storage space and a door 15 configured to open/close an opened front surface of the body 10.

Further, the storage space may be divided into a refrigerating chamber 12 and a freezing chamber 11. The refrigerating chamber 12 defines most space inside the body 10, and provides a space in which food may be received by a plurality of shelves and drawers.

The freezing chamber 11 may be arranged at an upper portion of the storage space, and may define a space independent from the refrigerating chamber 12. The freezing chamber 11 may be formed by a roll-bond-type evaporator 20.

The evaporator 20 is formed by bending a plate-shaped metal material into a tubular shape, and may define a space of the freezing chamber 11 therein. Further, a refrigerant passage through which the refrigerant may flow may be formed along at least a portion of a circumferential surface of the evaporator 20. Thus, when the refrigerant flows along the refrigerant passage, the freezing chamber 11, which is an internal space of the evaporator 20, may be directly cooled to a temperature suitable for cooling.

Meanwhile, the lower surface of the evaporator 20 is exposed to the upper surface of the refrigerating chamber 12. Thus, when the refrigerant flows, the refrigerating chamber 12 may be also directly cooled. An upper portion of the refrigerating chamber 12, which is adjacent to the lower surface of the evaporator 20, may be firstly cooled, and an interior of the refrigerating chamber 12 may be cooled by the natural convection in which cooled air moves downwards. That is, the refrigerating chamber 12 may be cooled by the evaporator 20 even without a separate fan.

The refrigerating chamber has a relatively larger volume than that of the freezing chamber 11, is cooled by the lower surface of the evaporator 20, and thus may be maintained at a relatively higher temperature than that of the freezing chamber 11. Further, an additional configuration such as a drawer may be arranged below the evaporator 20 as needed, cold air transferred from the evaporator 20 may be partially blocked.

A front plate 21 defining the front surface of the freezing chamber 11 may be provided on the front surface of the evaporator 20. The front plate 21 may be provided integrally with or separately from the evaporator 20. The front plate 21 may be mounted on a storage space inside the body 10 together with the evaporator 20, and may define a portion of the freezing chamber 11.

A freezing chamber door 111 configured to open/close the space inside the evaporator 20, that is, the freezing chamber 11, may be further provided in the front plate 21. The freezing chamber 11 and the refrigerating chamber 12 may be formed as independent storage spaces by the freezing chamber door 111, respectively.

Further, a manipulation member 211 may be provided in the front plate 21. The manipulation member 211, which is adapted to adjust a temperature in the body 10, may be connected to the thermostat 30 to set temperatures at which the thermostat 30 is switched on/off. The manipulation member 211 is mechanically configured, and may set an operation temperature of the thermostat 30 by a rotation scheme such as a knob.

The thermostat 30 may be switched on/off according to a temperature in the refrigerator 1 to generate a signal, and may variably control the cooling power by adjusting a frequency of a motor of a compressor 50 according to an ON/OFF signal.

The thermostat 30 may include a thermostat body 310 connected to a rotary shaft of the manipulation member 211, a refrigerant tube 320 extending from the thermostat body 310 to the bottom surface of the evaporator 20, and a fixing bracket 330 configured to fix the refrigerant tube 320.

Figure 9:
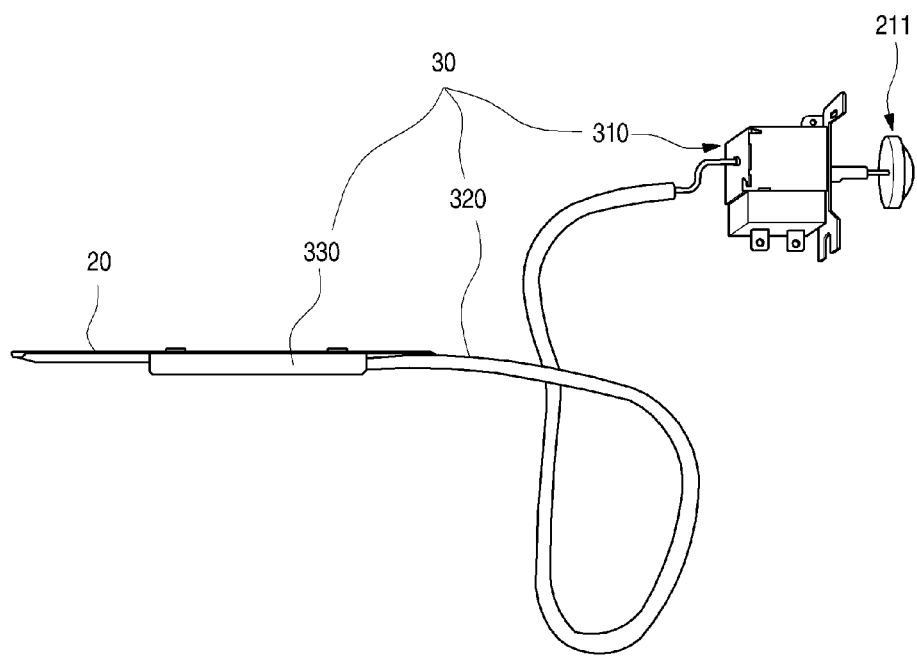
FIG. 9 is a view illustrating an arrangement state of a thermostat according to another embodiment of the present disclosure.
Figure 10:
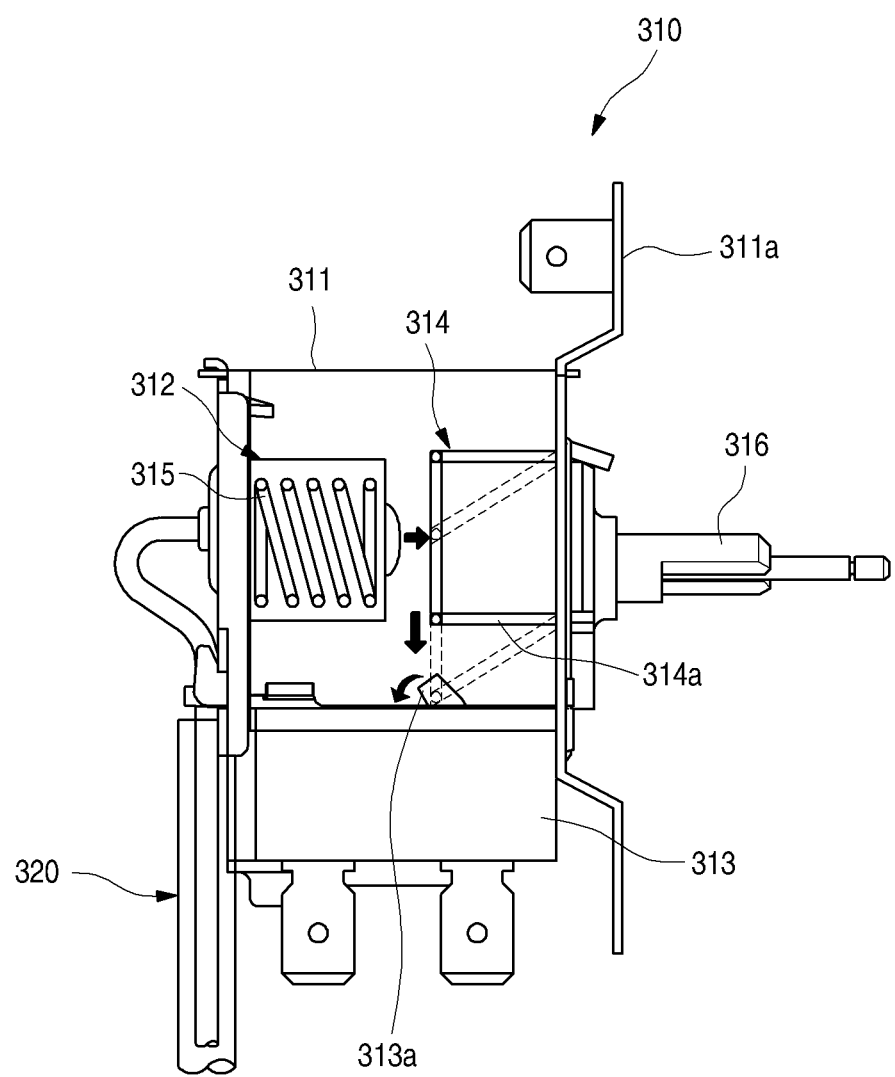
FIG. 10 is a view illustrating a structure of the thermostat.

FIG. 9 is a view illustrating an arrangement state of a thermostat according to another embodiment of the present disclosure. Further, FIG. 10 is a view illustrating a structure of the thermostat.

As illustrated in the drawings, one end of the refrigerant tube 320 may be in close contact with a lower end of the evaporator 20, and the other end of the refrigerant tube 320 is connected to the thermostat body 310. Further, the refrigerant tube 320 may be filled with the refrigerant.

Further, the one end of the refrigerant tube 320 may be accommodated inside the fixing bracket 330 provided on the lower surface of the evaporator 20. Further, a case 311 is fixed to the evaporator 20 by a fixing member so that a state in which the refrigerant tube 320 is closely fixed to the evaporator 20 may be maintained.

The thermostat body 310 may be arranged on a rear side of the front plate 21, and may be connected to the manipulation member 211. The thermostat body 310 may include the case 311, a bellows 312, a switch 313, and a connection member 314.

In more detail, the case 311 is formed such that the bellows 312, the switch 313, and the connection member 314 may be accommodated therein. Further, a case bracket 311a may be formed on one side of the case 311 to fix the thermostat body 310 to the front plate 21.

The bellows 312 is connected to the one end of the refrigerant tube 320, and has one end that is fixed to the case 311. A refrigerant (for example, R134), the volume of which changes according to a temperature, may be accommodated in the refrigerant tube 320 and the bellows 312, and the bellows 312 may be contracted or expanded according to a change in the volume of the refrigerant. That is, as the refrigerant inside the bellows 312 is expanded or compressed according to a temperature of the evaporator 20, the bellows 312 may be also expanded or contracted.

An elastic member 315 may be provided inside the bellows 312, and the shape of the bellows 312 is maintained as the elastic member 315 is contracted or expanded according to a change in the volume of the bellows 312. When the connection member 314 pushes the switch 313 as the bellows 312 is expanded, the thermostat 30 may output an ON signal, and when the connection member 313 is separated from the switch 313 as the bellows 312 is contracted, the thermostat 30 may output an OFF signal.

The connection member 314 is provided on an inner side of the case 311, which faces the bellows 312, and may move toward the bellows 312 by rotation of an adjustment shaft 316 connected to the manipulation member 211 so that a distance between the connection member 314 and the bellows 312 may be adjusted. Thus, an ON/OFF position of the switch 313 may be adjusted according to the expansion of the bellows 312, and accordingly, setting of the cooling power in the refrigerator may be adjusted.

At least a portion of the connection member 314 is rotated by contact with the bellows 312, to selectively push the switch 313. For example, as illustrated in FIG. 10, the connection member 314 may include a rotatably-coupled contact part 313a, and may be configured to push the switch 313 by rotating the contact part 313a by pressing of the bellows 312. The configuration of the connection member 314 may be variously changed as needed, and various structures which may push the switch 313 by the bellows 312 may be employed as the connection member 314.

Further, the switch 313 may be provided in the case 311 below the connection member 314. The switch 313 may be mounted on the lower surface of the case 311, a contact point part 314a for switching on/off may be located inside the case 311, and the switch 313 may be selectively pushed by the contact part 313a.

Thus, because whether the connection member 314 is in contact with the switch 313 by the contraction of the bellows 312 is determined based on the change in the volume of the refrigerant according to the temperature of the evaporator 20, the manipulation member 211 may be adjusted to adjust the temperature at which the thermostat 30 is switched on/off. That is, a cooling temperature in the refrigerator 1 may be set through manipulation of the manipulation member 211.

The thermostat 30 may be switched on/off when the evaporator 20 arrives at a set temperature, and at this time, the compressor PCB 40 determines operating of the evaporator 50 depending on the ON/OFF signal. Thus, the refrigerating chamber 12 and the freezing chamber 11 may be maintained at proper temperatures, and the compressor 50 is driven at a proper frequency according to a load, to provide variable cooling power, so that an interior of the refrigerator 1 is efficiently cooled.

Figure 11:
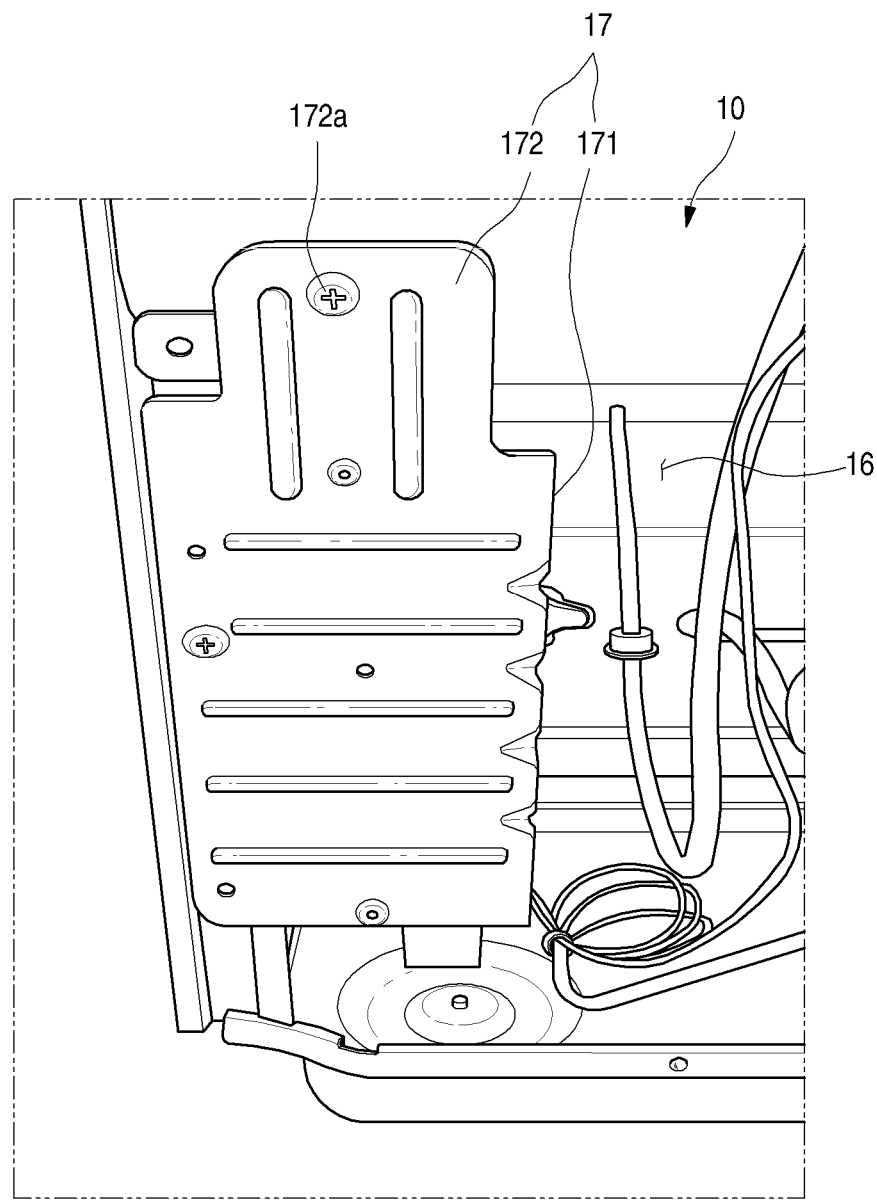
FIG. 11 is a partial perspective view illustrating a portion of a machine room of the refrigerator.
Figure 12:
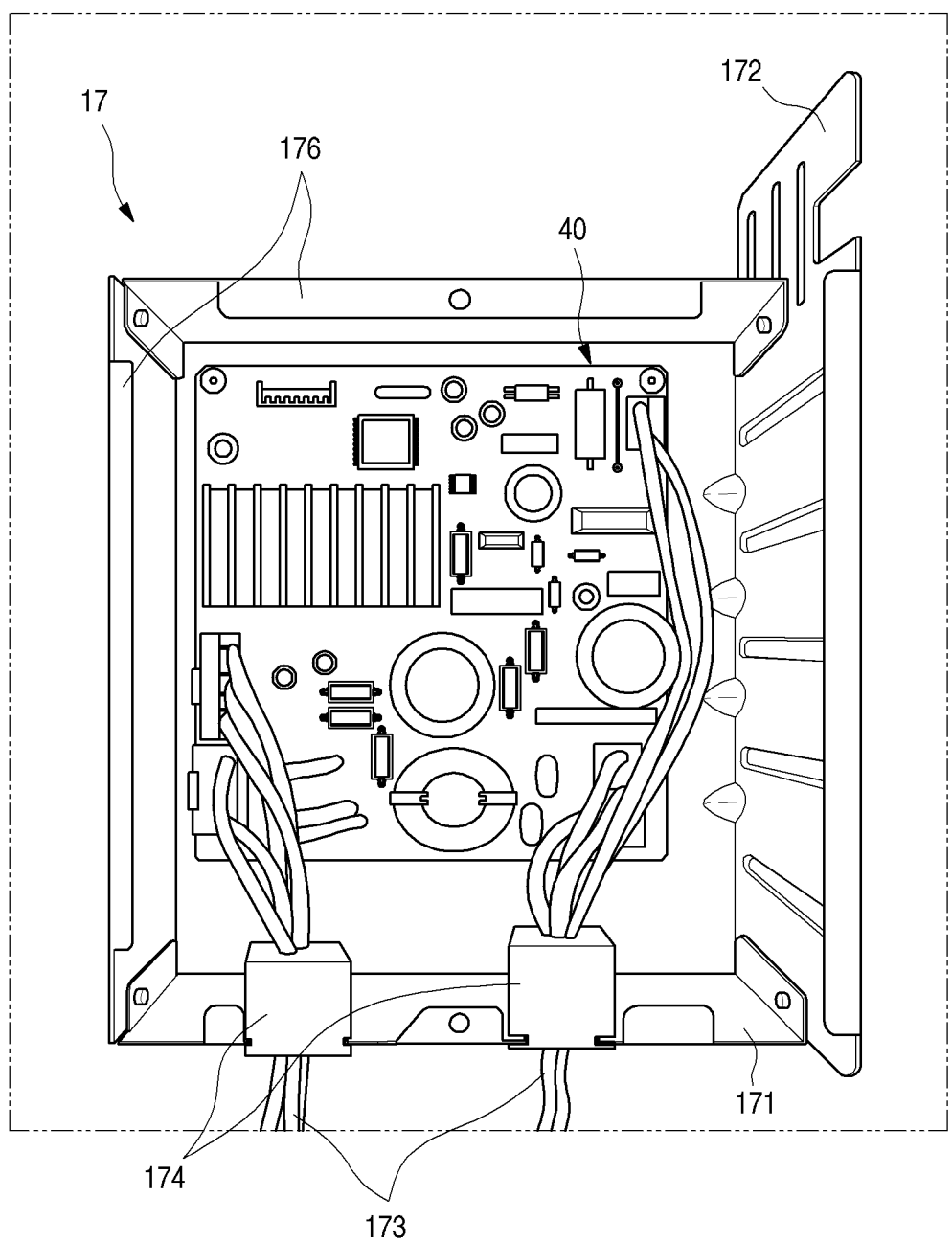
FIG. 12 is a perspective view illustrating a compressor PCB according to another embodiment of the present disclosure.

FIG. 11 is a partial perspective view illustrating a portion of a machine room of the refrigerator. Further, FIG. 12 is a perspective view illustrating a compressor PCB according to another embodiment of the present disclosure.

As illustrated in the drawings, a machine room 16 is formed at a lower end of the lower surface of the refrigerator body 10. The compressor 50, the condenser, a capillary tube, and the like constituting the refrigeration cycle may be arranged in the machine room 16, and the compressor PCB 40 configured to control the compressor 50 may be mounted on the machine room 16.

The compressor PCB 40 may be mounted on a PCB case 17, and the PCB case 17 may be fixedly mounted on one side of an opened rear surface of the machine room 16.

The PCB case 17 may be formed of a plate-shaped material, and may be bently formed of metal. The PCB case 17 may include an accommodation part 171 and a mounting part 172. The accommodation part 171 may have one surface having an opened hexahedral shape such that the compressor PCB 40 is accommodated therein. The compressor PCB 40 is fixedly mounted inside the PCB case 17.

Further, bent parts 176 may be formed at opened ends of the accommodation part 171, and the bent parts 176 may be fixedly mounted on side walls of the machine room 16 through screws, and the like. Thus, in a state in which the PCB case 17 is mounted, an opening of the accommodation part 171 may be shielded by a wall surface of the machine room 16, and the internal compressor PCB 40 may be safely protected.

Wire insertion/withdrawal parts 174 through which electric wires 173 are inserted/withdrawn may be provided on sides of the bottom surface of the accommodation part 171. The wire insertion/withdrawal parts 174 may be provided on the bottom surface of the accommodation part 171, and the electric wires 173 may pass through the wire insertion/withdrawal parts 174 to be introduced into the accommodation part 171 and may be connected to the compressor PCB 40.

The pair of wire insertion/withdrawal parts 174 may be provided, and the electric wires 173 introduced through the wire insertion/withdrawal parts 174 supply electric power to a noise filtration unit 42 and a thermostat recognition unit 45.

Further, the mounting part 172 extending upwards is formed at an upper end of the accommodation part 171. In a state in which the accommodation part 171 is arranged inside the machine room 16, the mounting part 172 may be fixedly mounted to an upper end of the machine room 16 through a coupling member 172a such as a screw.

Meanwhile, the compressor PCB 40 may be connected to the compressor 50 and the thermostat 30. Further, the operating of the compressor 50 may be controlled by an ON/OFF signal input by the thermostat 30.

Figure 13:
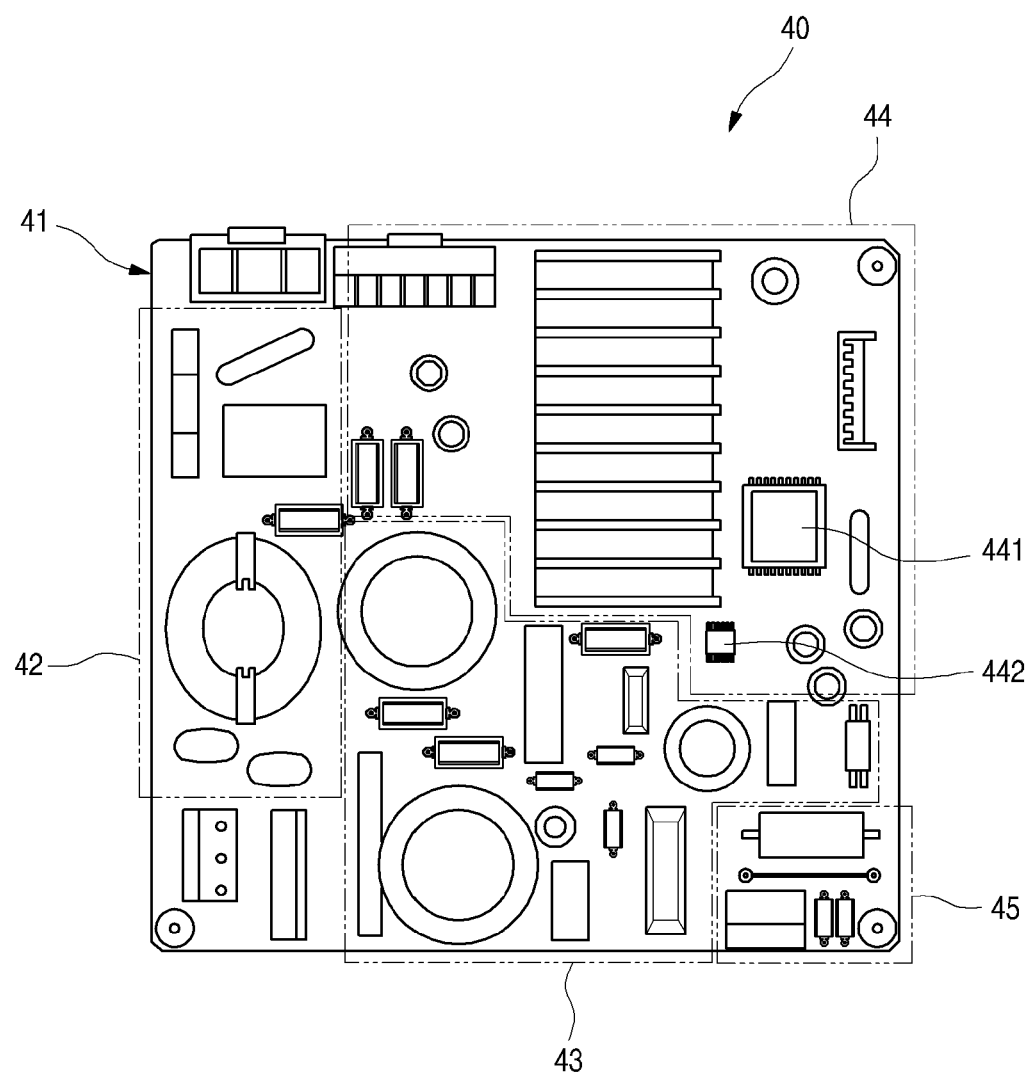
FIG. 13 is a view schematically illustrating a configuration of the compressor PCB.

FIG. 13 is a view schematically illustrating a configuration of the compressor PCB.

As illustrated in the drawing, the compressor PCB 40 may be configured such that one substrate 41 includes the noise filtration unit 42, a power supply unit 43, a compressor operation unit 44, and the thermostat recognition unit 45.

In detail, the noise filtration unit 42, which removes unstable noise of electric power input to the compressor PCB 40, may protect the PCB from an excess voltage and an excess current. That is, the noise filtration unit 42 functions to protect a system by interrupting an abnormal voltage or an abnormal current when the abnormal voltage and the abnormal current is supplied.

The power supply unit 43 may be configured to supply electric power to the compressor operation unit 44 for driving of the compressor 50. That is, the power supply unit converts input alternating current (AC) power into direct current (DC) power, and supplies electric power to an inverter driving unit 442 and a microcomputer 441 of the compressor operation unit 44.

The compressor operation unit 44 includes the inverter driving unit 442 and the microcomputer 441. The inverter driving unit 442 generates a waveform for inverter driving of the compressor 50 using the electric power input from the power supply unit 43 and a signal of the microcomputer 441. The inverter driving unit 442 may be configured to have the same structure as that of an inverter driving unit of the general inverter-type compressor 50.

Meanwhile, the microcomputer 441 may include a timer, and may integrate an ON/OFF time of the compressor 50 through a signal input by the thermostat 30. The microcomputer 441 may be connected to the thermostat recognition unit 45, and may calculate an operation rate of the compressor 50 using a signal transferred through the thermostat recognition unit 45. Further, when data of the microcomputer 441 is reset due to switching-off of a power supply, the microcomputer 441 may be set to generate a signal of instructing a middle speed operation after the compressor 50 is switched off for a set time.

The thermostat recognition unit 45 is configured to transfer the ON/OFF signal of the thermostat 30 to the microcomputer 441. Further, the microcomputer 441 determines an operation state of the compressor 50 using a signal transferred from the thermostat recognition unit 45.

The thermostat recognition unit 45, which converts an input AC voltage into a low voltage that may be recognized by the microcomputer 441 using a photo coupler 456, may transfer the ON/OFF signal of the thermostat 30 to the microcomputer 441 in an insulated state.

Hereinafter, the thermostat recognition unit will be described in more detail.

Figure 14:
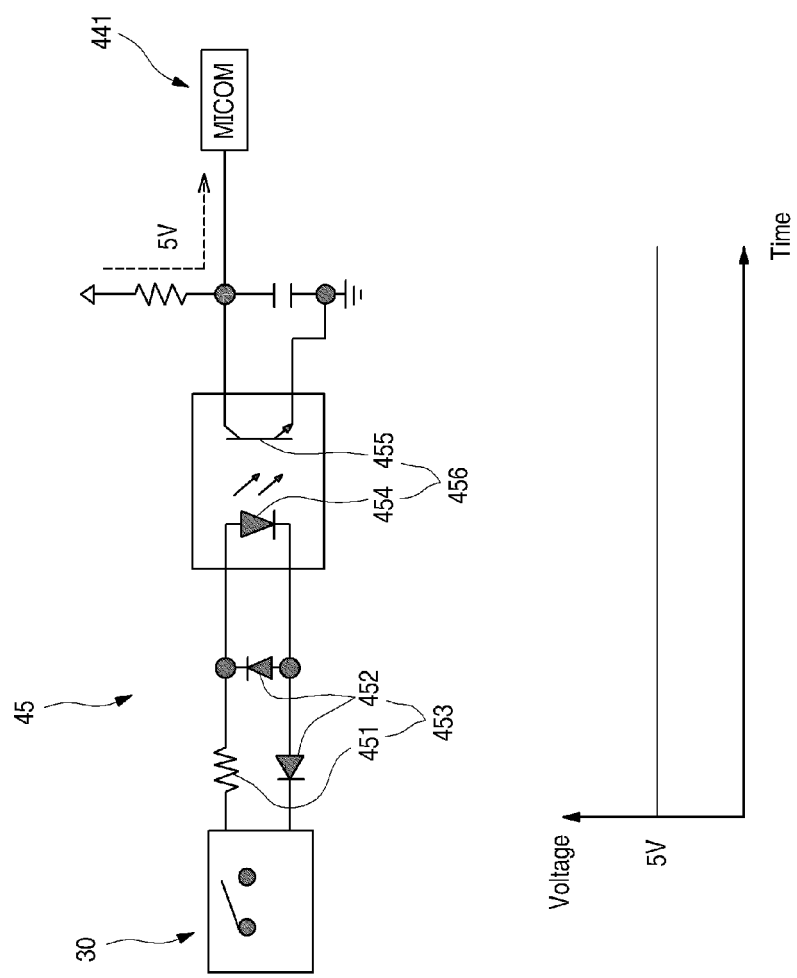
FIG. 14 is a view illustrating a state of a thermostat recognition unit and a signal supply state of a microcomputer when the thermostat is switched off.

FIG. 14 is a view illustrating a state of a thermostat recognition unit and a signal supply state of a microcomputer when the thermostat is switched off.

As illustrated in the drawing, the thermostat recognition unit 45 is configured to connect the thermostat 30 and the microcomputer 441 to each other. The thermostat recognition unit 45 configures a pulse conversion circuit 453 using a surge resistor 451 and a diode 452. Further, the pulse conversion circuit 453 may be configured to convert a signal input to the microcomputer 441 into a pulse signal by a light emission unit 454 and a light reception unit 455 of the photo coupler 456, and transfer the converted pulse signal.

In a state in which the temperature of the evaporator 20 is satisfied, the thermostat 30 is switched off. Thus, the pulse conversion circuit 453 is not in a closed loop state, and does not transfer the signal through the photo coupler 456.

In this state, only a 5V signal input from the power supply unit 43 is input to the microcomputer 441, and the microcomputer 441 determines the signal as an OFF signal of the compressor 50 to switch off the compressor 50. Further, while the compressor 50 is switched off, the microcomputer 441 integrates a stop time for which the compressor 50 is switched off.

Figure 15:
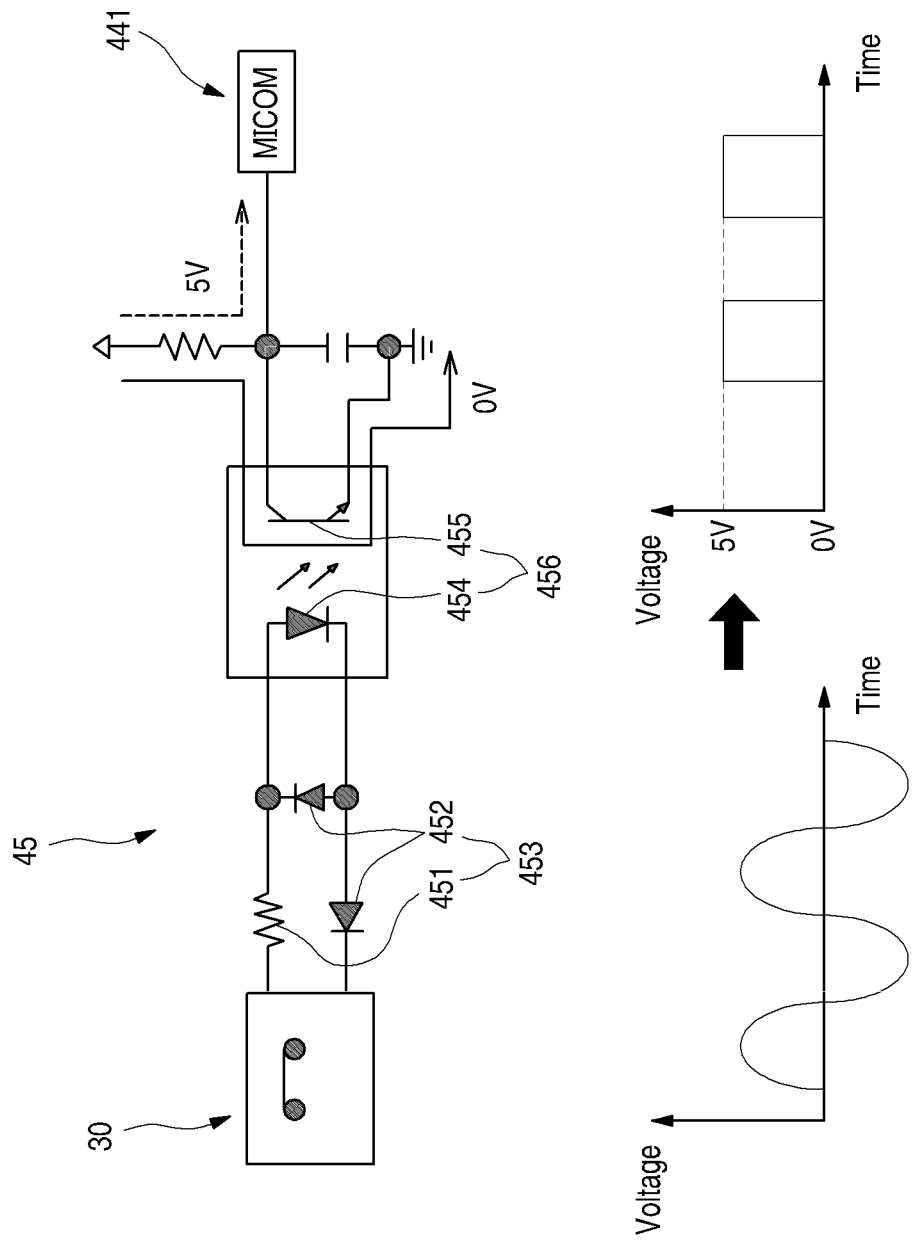

FIG. 15 is a view illustrating the state of the thermostat recognition unit and the signal supply state of the microcomputer when the thermostat is switched on.

As illustrated in the drawing, when the temperature of the evaporator 20 is unsatisfied, the thermostat 30 is switched on. Further, the pulse conversion circuit 453 is in the closed loop state by the thermostat 30, so that the light emission unit 454 of the photo coupler 456 may be switched on/off according to a phase of a sinusoidal signal supplied through the thermostat 30.

When the light emission unit 454 of the photo coupler 456 is switched on so that a signal is transferred to the light reception unit 455, electric power input from the power supply unit 43 is grounded so that a 0V signal is transferred to the microcomputer 441. Further, when the light emission unit 454 of the photo coupler 456 is switched off so that the signal is not transferred to the light reception unit 455, the input 5V signal is transferred to the microcomputer 441.

That is, when the thermostat 30 is switched on, the 0V pulse signal and the 5V pulse signal are input to the microcomputer 441, and the microcomputer 441 determines the pulse signals as an ON signal of the compressor 50 when the pulse signals are input, to drive the compressor 50. Further, while the compressor 50 is driven, a counter of the microcomputer 441 integrates an operation time of the compressor 50.

Meanwhile, in this way, the microcomputer 441 may calculate the operation rate by integrating the operation time and the stop time of the compressor 50. The operation rate may be calculated based on an average of two cycles that were operated immediately previously. That is, when the compressor 50 is switched on and off twice consecutively, the operation rate may be calculated as a ratio of a time for which the compressor 50 is switched on to the entire time.

The operation rate may be calculated based on a plurality of cycles including the two cycles. In this way, the operation rate is calculated based on the plurality of cycles, so that the compressor 50 is prevented from being abnormally driven due to calculation of the operation rate by an abnormal operation, even when the compressor 50 is abnormally operated.

Further, when the operation rate is calculated based on the excessively large number of cycles, the operation of the compressor 50 cannot promptly cope with a load, and thus operation efficiency deteriorates. Thus, it is most preferable that to accurately and effectively determine the operation rate of the compressor 50, the operation rate of the compressor 50 is calculated based on the two cycles.

Meanwhile, the compressor 50 may be operated and controlled in a state in which the frequency of the compressor varies by the microcomputer 441. Hereinafter, for convenience of description and understanding, a case where the compressor 50 is operated in three sections including a low speed operation, a middle speed operation, and a high speed operation will be described as an example.

Hereinafter, the driving of the compressor having such a configuration will be described in detail with reference to the accompanying drawings.

Figure 16:
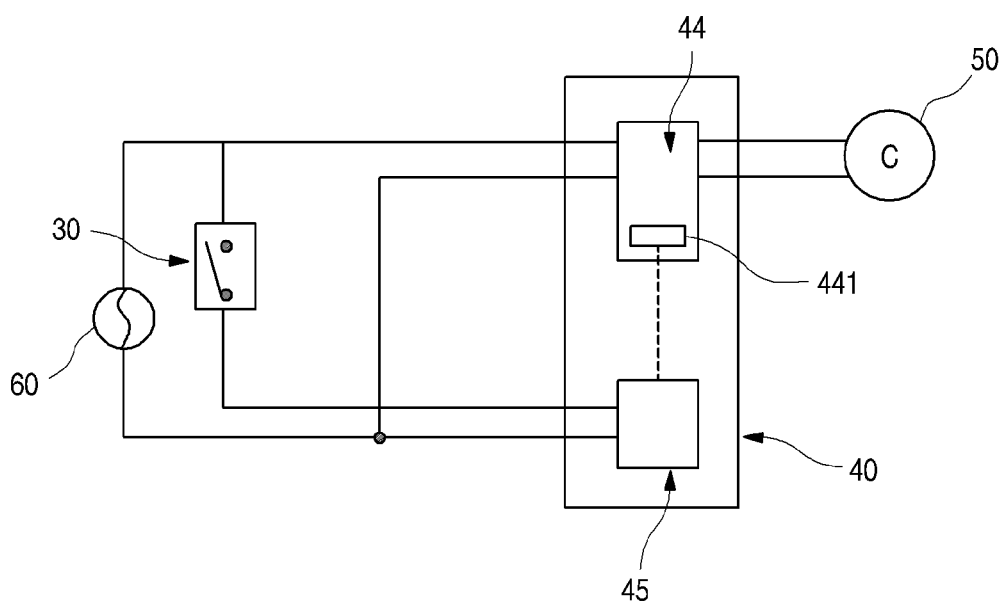
FIG. 16 is a circuit diagram schematically illustrating power connection states of the thermostat, the compressor PCB, and a compressor.

FIG. 16 is a circuit diagram schematically illustrating power connection states of the thermostat, the compressor PCB, and the compressor.

As illustrated in the drawing, a normal power source 60 may supply electric power to the compressor PCB 40, and the thermostat 30 may be provided between the normal power source 60 and the compressor PCB 40.

The normal power source 60 may always supply electric power for driving of the microcomputer 441 of the compressor PCB 40, and may selectively supply electric power to the thermostat recognition unit 45 by the thermostat 30.

In a state in which the temperature in the refrigerator 1 is satisfied and thus the thermostat 30 is switched off, the pulse conversion circuit 453 is not operated in the thermostat recognition unit 45. Thus, the 5V signal of the power supply unit 43 is continuously supplied, and the microcomputer 441 determines the 5V signal as an OFF signal for the compressor 50, to switch off the compressor 50 and integrate the stop time of the compressor 50.

Further, in a state in which the temperature in the refrigerator 1 is not satisfied and thus the thermostat 30 is switched on, the pulse conversion circuit 453 is operated in the thermostat recognition unit 45. Thus, the 5V pulse signal and the 0V pulse signal of the power supply unit 43 are input to the microcomputer 441. When the pulse signals are input to the microcomputer 441, the microcomputer 441 determines the pulse signals as an ON signal for the compressor 50, to drive the compressor 50 and integrate the operation time of the compressor 50.

The microcomputer 441 controls the compressor 50 to be operated at the middle speed when the compressor 50 is initially operated or is operated after power failure. Further, the microcomputer 441 calculates the operation rate of the compressor 50 when the compressor 50 is continuously operated and controls the compressor 50 by varying the frequency according to the operation rate of the compressor 50.

The compressor 50 may be operated by varying the frequency by directly determining the ON and OFF signals input from the thermostat 30 by the microcomputer 441 of the compressor PCB 40. That is, in the compressor 50, the compressor PCB 40 may directly control a cooling power-variable operation without separate communication for determining a load, according to the detected load by the thermostat 30.

Figure 17:
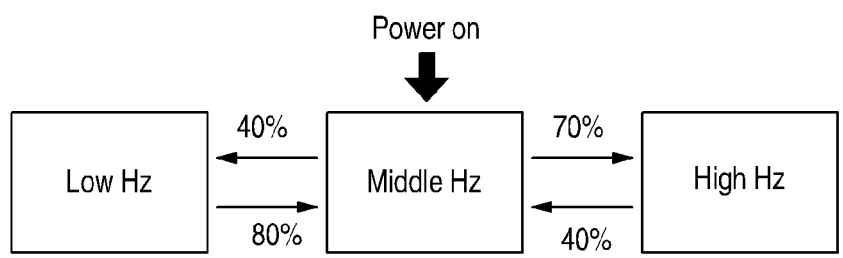
FIG. 17 is a view schematically illustrating a change of an operation state of the compressor according to another embodiment of the present disclosure.

FIG. 17 is a view schematically illustrating a change of an operation state of the compressor according to another embodiment of the present disclosure.

As illustrated in the drawing, firstly, when electric power for driving the compressor 50 is input, the compressor 50 is operated at the middle speed. Here, the middle speed may be defined as a range including a specific speed value as a middle speed between a maximum speed and a minimum speed for driving the compressor as well as the specific value.

The compressor 50 is operated at the middle speed, and the driving time and the stop time of the compressor 50 may be integrated by the microcomputer 441. Further, the microcomputer 441 may control the operation of the compressor 50 by calculating the operation rate of the compressor 50.

For example, in a state in which the compressor 50 is operated at the middle speed (middle Hz), when the operation rate is between a first setting operation rate (for example, 40%) and a second setting operation rate (for example, 70%), the middle speed operation of the compressor 50 is maintained.

Further, when the operation rate is not more than the first setting operation rate in the middle speed operation, the microcomputer 441 determines that the cooling power for cooling the interior of the refrigerator is sufficient. Further, the microcomputer 441 decreases the frequency to decrease a rotation speed of the compressor 50, so that the compressor 50 is operated in the low speed (low Hz) operation.

When the operation rate is not less than a third setting operation rate (for example, 80%) in the low speed operation, the microcomputer 441 determines that the cooling power for cooling the refrigerator 1 is insufficient. Further, the microcomputer 441 increases the frequency to increase the rotation speed of the compressor 50, so that the compressor 50 is operated in the middle speed operation.

Meanwhile, in the low speed operation, even though the operation rate decreases, the rotation speed may not decrease any more. Thus, until the operation rate arrives at the third setting operation rate, the low speed operation is maintained.

Further, the third setting operation rate may be set to be higher than the second setting operation rate due to characteristics of the low speed operation. In the low speed operation, the freezing chamber and the refrigerating chamber are directly cooled using the evaporator 20, and due to structural characteristics of the thermostat 30 located in the evaporator 20, when the operation rate is set to be low, the operation is quickly switched. When interruption of the operating time is excessively generated, the entire interior of the refrigerating chamber 12 that is relatively far from the evaporator 20 is cooled relatively slowly. Thus, in a state in which the low speed operation is maintained, the low speed operation is maintained for a long time as much as possible, and the operation rate for switching of operation is set to be high to satisfy the temperature of the refrigerating chamber 12, so that frequent interruption of the operation of the compressor 50 is prevented.

When the operation rate is not more than the second setting operation rate in the middle speed operation, the microcomputer 441 determines that the cooling power for cooling the interior of the refrigerator 1 is insufficient. Further, the microcomputer 441 increases the frequency to increase the rotation speed of the compressor 50, so that the compressor 50 is operated in the high speed (high Hz) operation.

When the operation rates of the previous cycles are not more than a fourth setting operation rate (for example, 40%) in the high speed operation, the microcomputer 441 determines that the cooling power for cooling the refrigerator is sufficient. Further, the microcomputer 441 decreases the frequency to decrease the rotation speed of the compressor 50, so that the compressor 50 is operated in the middle speed operation.

In this way, in an initial operation, the compressor may start to be operated at the middle speed. After the initial operation, the compressor 50 may perform a continuous operation in which the rotation speed is maintained, or increases or decreases by one stage according to the operation rate of the previous cycle.

The compressor 50 may start to be operated at a speed increased by one stage when the cooling power is insufficient based on the operation rate if the temperature in the refrigerator is satisfied and the thermostat 30 is switched on in turn after being switched off, and may start to be operated at a speed decreased by one stage when the cooling power is excessive. That is, the compressor 50 may be operated at an optimum rotation speed in accordance with a load in the refrigerator.

Meanwhile, hereinafter, the operation of the compressor according to the embodiment of the present disclosure will be described in more detail.

Figure 18:
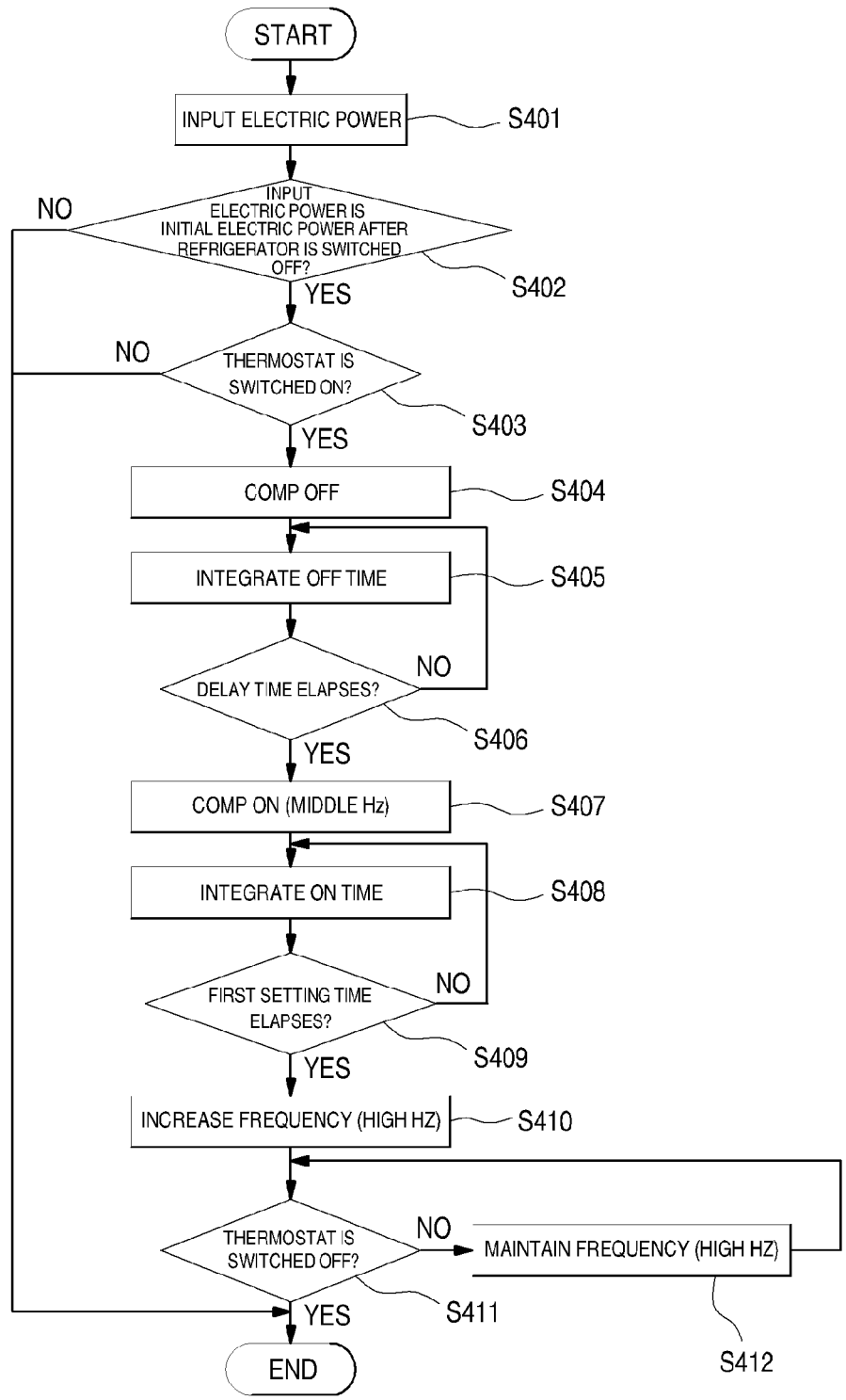
FIG. 18 is a flowchart illustrating an initial operation process of the compressor according to another embodiment of the present disclosure.
Figure 19:
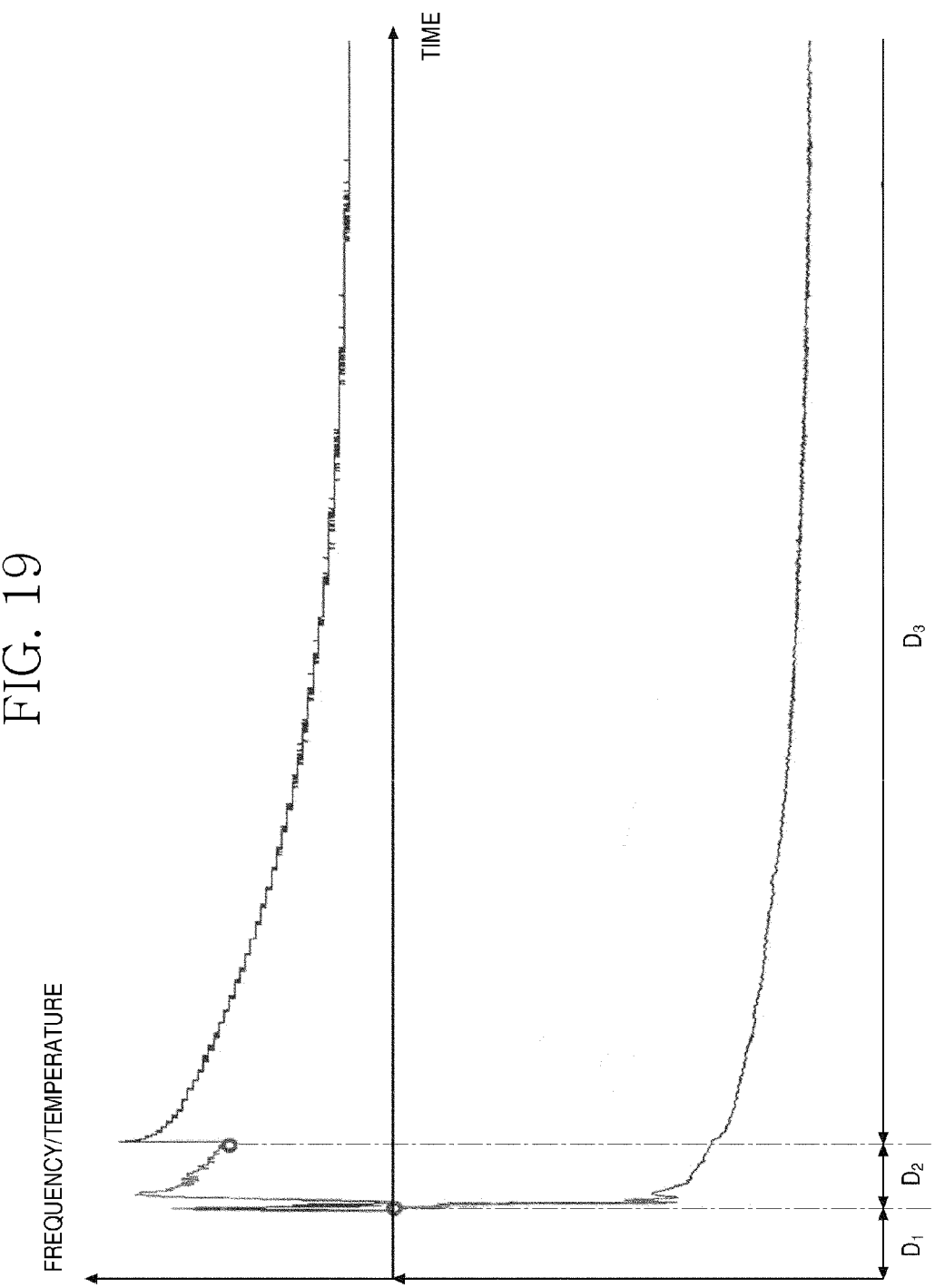
FIG. 19 is a graph depicting changes in a frequency and a temperature when the compressor according to another embodiment of the present disclosure is initially operated.

FIG. 18 is a flowchart illustrating an initial operation process of the compressor according to another embodiment of the present disclosure. Further, FIG. 19 is a graph depicting changes in a frequency and a temperature when the compressor according to another embodiment of the present disclosure is initially operated.

An operation in which after the refrigerator 1 is completely switched off, electric power is supplied, and an interior of the refrigerator 1 is cooled down to a set temperature and is stabilized may be defined as an initial operation or a full-down operation.

A process of such an initial operation will be described with reference to the accompanying drawings.

When electric power is initially input to the refrigerator 1 (S401), the microcomputer 441 determines whether input electric power is initial input electric power after the refrigerator 1 is switched off. This determination is based on operation information stored in the microcomputer 441, and when previous operation information of the compressor 50 that is, information on the operation rate, is stored in the microcomputer 441, the microcomputer 441 determines that a current operation is not an initial operation, to terminate the initial operation.

On the other hand, when the input electric power is the initial input electric power after the refrigerator 1 is switched off, a current state corresponds to a reset state in which the previous operation information of the compressor 50 is not stored in the microcomputer 441. When the microcomputer 441 determines that the input electric power is the initial electric power after the refrigerator 1 is switched off, first, the compressor 50 is not immediately operated to protect the compressor 50, and the compressor is maintained in a stopped state for a set delay time (S402).

Further, the microcomputer 441 determines whether the thermostat 30 is switched on (S403). When the thermostat 30 is switched on, the microcomputer 441 firstly switches off the compressor 50, and then integrates an OFF time of the compressor 50 (S404), (S405).

When the compressor 50 is immediately rotated after a stopped state, the compressor 50 is damaged by fire or noise is generated, due to friction by internal pressure of the compressor 50. Thus, the compressor 50 is maintained in an OFF state such that an operation of the compressor 50 may be delayed for a predetermined delay time D1 (for example, 7 minutes), and the internal pressure of the compressor 50 is resolved (S406).

When the delay time elapses, the microcomputer 441 starts an initial operation of the compressor 50, and here, the compressor 50 may necessarily start to be operated at the middle speed (middle Hz). The microcomputer 441 is set such that when it is determined that the compressor 50 is initially operated, the compressor 50 may be operated at the middle speed, and even when the refrigerator 1 is switched off, and electric power is then input to the refrigerator 1 again, such setting may be maintained (S407). Further, the microcomputer 441 integrates an ON time of the compressor 50 (S408).

Meanwhile, the compressor 50 may be operated at the middle speed for a first setting time D2. The setting period is approximately 20 minutes, and the compressor 50 may be consistently operated at the middle speed without being stopped. The compressor 50 starts to be operated at the middle speed, so that the temperature in the refrigerator 1 may be sharply lowered from the room temperature, and may arrives at approximately a subzero temperature by the middle speed operation. Thus, even though the compressor 50 is operated at the high speed later, the interior of the refrigerator 1 is already sufficiently cooled, so that while frequent interruption of the compressor 50 is prevented, the interior of the refrigerator 1 may be rapidly cooled.

In detail, the present embodiment, has a problem in that although the thermostat 30 is mounted to be in contact with the evaporator 20, so that the temperature of the evaporator 20, that is, the temperature of the freezing chamber 11, may be accurately measured, the temperature of the refrigerating chamber cooled by the evaporator 20 cannot be accurately reflected.

In this state, when the compressor 50 is operated at the high speed (high Hz) to rapidly cool the interior of the refrigerator 1, the temperature of the evaporator 20 may be rapidly satisfied, but the temperature of the refrigerating chamber 12 is not satisfied while the temperature of the evaporator 20 is satisfied. That is, there is a problem in that because the compressor 50 is stopped due to the rapid satisfaction of the temperature of the evaporator 20, the temperature of the refrigerating chamber 12 may be unsatisfied.

Further, when the compressor 50 is operated at the low speed such that the temperature of the evaporator 20 becomes similar to the temperature of the refrigerating chamber 12, and thus the temperature of the evaporator 20 is relatively high, a very long time may be consumed for satisfying the temperatures of the refrigerating chamber 12 and the freezing chamber 11 due to weak cooling power.

However, as in the present embodiment, when the compressor 50 starts to be initially operated at the middle speed, the compressor 50 may be consistently operated while the temperature of the evaporator 20 is not greatly different from the temperature of the refrigerating chamber, so that the interior of the refrigerator 1 may be rapidly cooled (S409).

Meanwhile, when the continuous time elapses, the microcomputer 441 increases the frequency of the compressor 50 by one stage to increase the rotation speed of the compressor 50 so that the compressor 50 may be operated at the high speed. That is, the compressor initially starts to be operated at the middle speed, and may be operated at the high speed immediately after the continuous time elapses, so that the refrigerator 1 which arrives at the subzero temperature may be additionally cooled (S410).

Such a high speed operation may be maintained until the temperature of the refrigerator 1 is satisfied and thus the thermostat 30 is switched off (D3), and when the thermostat 30 is switched off, it is determined that the temperature of the refrigerator 1 is satisfied, and thus, the high speed operation is terminated and the initial operation is terminated (S411) (S412).

Figure 20:
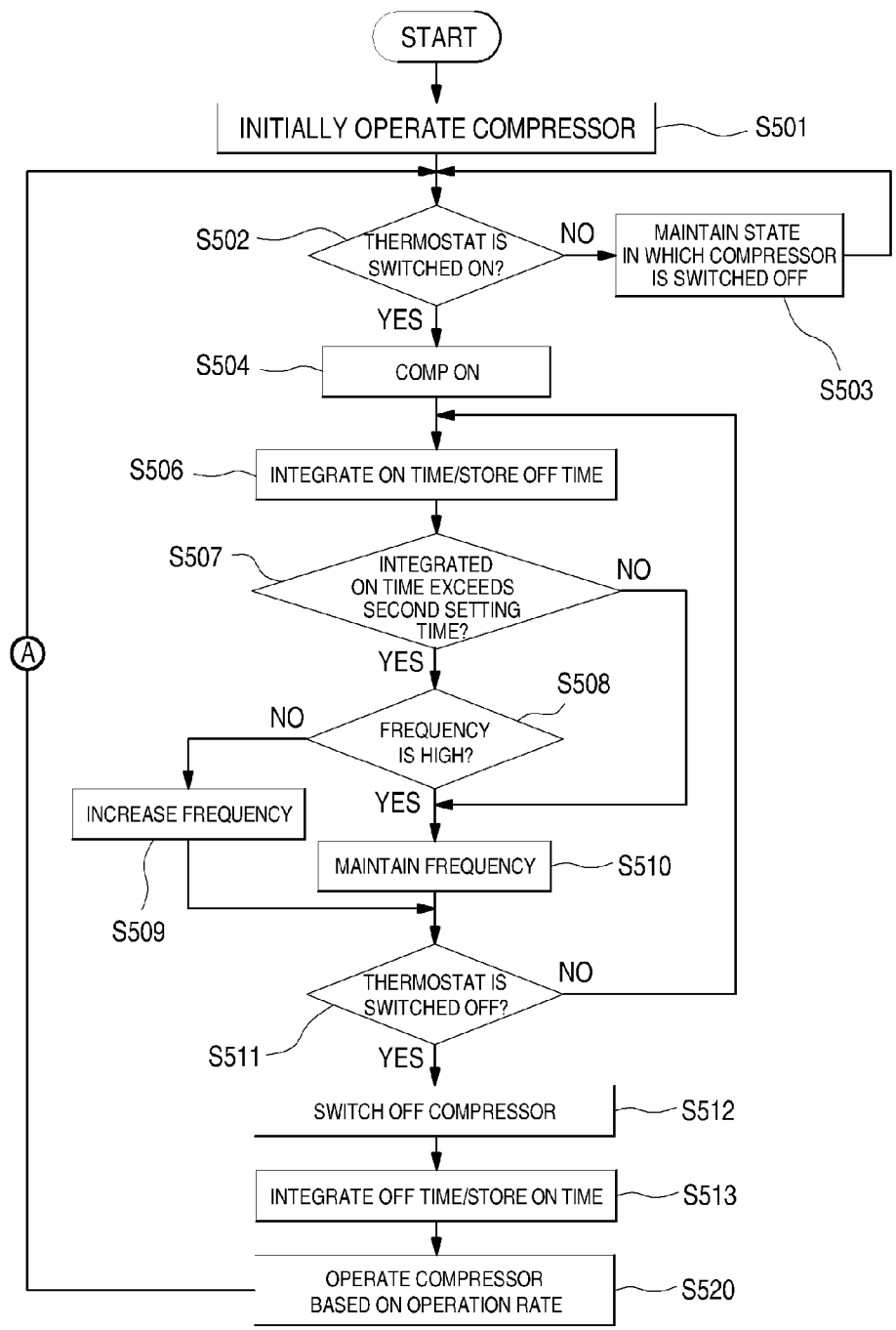
FIG. 20 is a flowchart illustrating a continuous operation process of the compressor according to another embodiment of the present disclosure.
Figure 21:
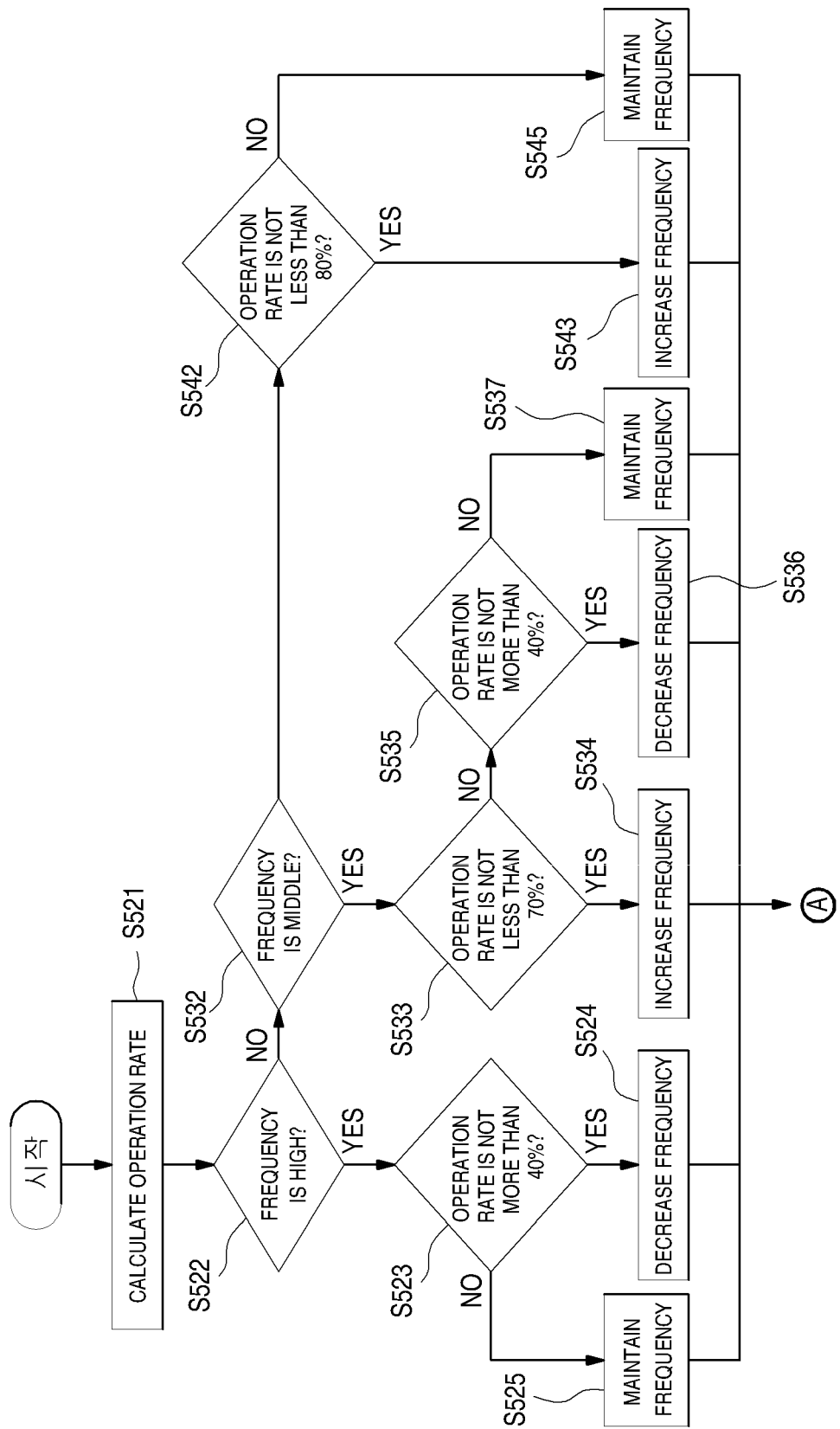
FIG. 21 is a flowchart illustrating an operation rate operating process of the compressor according to another embodiment of the present disclosure.

FIG. 20 is a flowchart illustrating a continuous operation process of the compressor according to another embodiment of the present disclosure. Further, FIG. 21 is a flowchart illustrating an operation rate operating process of the compressor according to another embodiment of the present disclosure.

As illustrated in the drawings, after the initial operation is terminated, a continuous operation in which the driving frequency of the compressor 50 is determined based on the operation rate may be performed (S501).

In detail, when the temperature in the refrigerator 1 arrives at the set temperature after the initial operation is terminated, the thermostat 30 is switched on, and the compressor is maintained in the OFF state until the thermostat 30 is switched on (S502) (S503).

When the thermostat 30 is switched on, the microcomputer 441 generates a driving signal for driving the compressor, so that the compressor is switched on (S504). At the same time, the microcomputer 441 integrates the ON time of the compressor 50 to calculate the operation rate later, and stores the integrated OFF time of the compressor 50 (S506).

Meanwhile, when the compressor 50 is switched on after the initial operation is terminated, the compressor 50 may be operated at the high speed. This is because the operation rate of the compressor 50 is very high in the initial operation, and thus, when the operation rate is calculated in a state in which the operation rate of a cycle in which the compressor 50 is rotated at an arbitrary frequency is summed, the operation rate is very high, and thus a condition of the high speed operation may be satisfied.

Of course, when it is impossible to calculate the operation rate because a plurality of cycles are not continuously performed after the initial operation is terminated, a setting may be made such that one of the high speed operation and the middle speed operation is preferentially performed.

Further, when the compressor 50 is not firstly switched on after the initial operation is terminated, but the compressor is switched on again after the frequency is varied by the operation rate, the microcomputer 441 may calculate the operation rate, and the compressor 50 may be operated at the varied frequency.

While the compressor 50 is driven, the microcomputer 441 integrates the ON time of the compressor 50 to determine whether the integrated ON time exceeds a second setting time. When the compressor 50 is consistently switched on for the second setting time or more in a single cycle, the microcomputer 441 determines that the cooling power is insufficient, to increase the frequency of the compressor 50 by one stage. That is, the rotation speed of the compressor 50 increases to provide larger cooling power to the interior of the refrigerator 1.

Here, the second setting time, which is a reference, may be set to be longer than the first setting time for which the compressor 50 is operated at the middle speed in the initial operation. Unlike the initial operation, the continuous operation is performed such that because a cooling operation is performed in a state in which the temperature in the refrigerator 1 is relatively stabilized, a consistent and stable cooling operation rather than a rapid and sharp cooling operation is performed to maintain the temperature.

Thus, the second setting time may be set to be 1.3 times as long as a time for which one cycle is performed in a generally normal operation state, in consideration of environment conditions. For example, the second setting time may be set in a range of 20 minutes to 60 minutes. However, the second setting time may change according to an installation environment and a usage environment of the refrigerator 1 (S509).

Here, because the rotation speed of the compressor 50 cannot be increased in a high speed operation state in which the frequency of the compressor 50 is maximum, the current frequency, that is, the high speed operation state, is maintained (S510).

Such an operation of the compressor 50 continues until the temperature in the refrigerator 1 satisfies the set temperature and thus the thermostat 30 is switched off, and the microcomputer 411 integrates the ON time of the compressor 50 until the thermostat is switched off (S511).

When the OFF signal is input from the thermostat 30, the microcomputer 441 switches off the compressor 50 (S512). At the same time, the microcomputer 441 integrates the OFF time of the compressor 50, and stores the integrated ON time of the compressor 50 (S513).

The operation rate of the compressor 50 may be calculated using the ON time and the OFF time of the compressor 50, which are stored in the microcomputer 441, and a frequency-variable operation, that is, an operation rate operation, of the compressor 50 may be performed by the calculation of the operation rate.

The operation rate operation will be described in more detail with reference to FIG. 21. The microcomputer 441 calculates the operation rate of a plurality of cycles (preferably, two continuous cycles) continuously operated immediately before.

Here, the frequency of the compressor 50 in a next cycle is determined by comparison with the operation rate calculated according to the frequency of the compressor in an immediately previous cycle.

In detail, when the compressor is operated at the high speed at a high frequency in the immediately previous cycle, and the operation rate calculated by the microcomputer 441 is not more than the fourth setting operation rate (for example, 40%), the microcomputer 441 determines that the cooling power is excessively supplied to the interior of the refrigerator 1. Thus, the microcomputer 441 decreases the frequency of the compressor 50, and performs a control such that the compressor 50 is operated at the middle speed (S524).

Further, when the compressor 50 is operated at the high speed at the high frequency in the immediately previous cycle, and the operation rate calculated by the microcomputer 441 is larger than the fourth setting operation rate, the microcomputer 441 performs a control such that the compressor 50 is operated at the high speed while the immediately previous frequency is maintained (S525).

Meanwhile, when the compressor 50 is operated at the middle speed at a middle frequency in the immediately previous cycle, and the operation rate calculated by the microcomputer 441 is not less than the second setting operation rate (for example, 70%), the microcomputer 441 determines that the cooling power is insufficiently supplied to the interior of the refrigerator 1 (S532) (S533). Thus, the microcomputer 441 increases the frequency of the compressor 50, and performs a control such that the compressor 50 may be operated at the high speed (S534).

Further, when the compressor 50 is operated at the middle speed at the middle frequency in the immediately previous cycle, and the operation rate calculated by the microcomputer 441 is not more than the first setting operation rate (for example, 40%), the microcomputer 441 determines that the cooling power is excessively supplied to the interior of the refrigerator 1 (S535). Thus, the microcomputer 441 decreases the frequency of the compressor 50, and performs a control such that the compressor 50 is operated at the low speed (S536).

Further, when the compressor 50 is operated at the middle speed at the middle frequency in the immediately previous cycle, and the operation rate calculated by the microcomputer 441 is between the first setting operation rate and the second setting operation rate, the microcomputer 441 determines that the cooling power is properly supplied to the interior of the refrigerator 1. Thus, the microcomputer 441 maintains the frequency of the compressor 50, and performs a control such that the compressor 50 is operated at the middle speed (S537).

Meanwhile, when the compressor 50 is operated at the low speed at a low frequency, which is neither the high frequency nor the middle frequency, in the immediately previous cycle, and the operation rate calculated by the microcomputer 441 is not less than the third setting operation rate (for example, 80%), the microcomputer 441 determines that the cooling power is insufficiently supplied to the interior of the refrigerator (S542). Thus, the microcomputer 441 increases the frequency of the compressor 50, and performs a control such that the compressor 50 may be operated at the middle speed (S543).

Further, when the compressor 50 is operated at the low speed at the low frequency in the immediately previous cycle, and the operation rate calculated by the microcomputer 441 is smaller than the third setting operation rate, the microcomputer 441 performs a control such that the compressor 50 is operated at the low speed while the immediately previous frequency is maintained (S545).

An operation frequency of the compressor 50 may be continuously determined as the changed frequency, the compressor 50 starts to be operated at the changed frequency, and the continuous operation is performed again. Thus, the frequency of the compressor 50 is changed by one stage according to a change in the load in the refrigerator 1, so that the compressor 50 may immediately cope with required cooling power.

Figure 22:
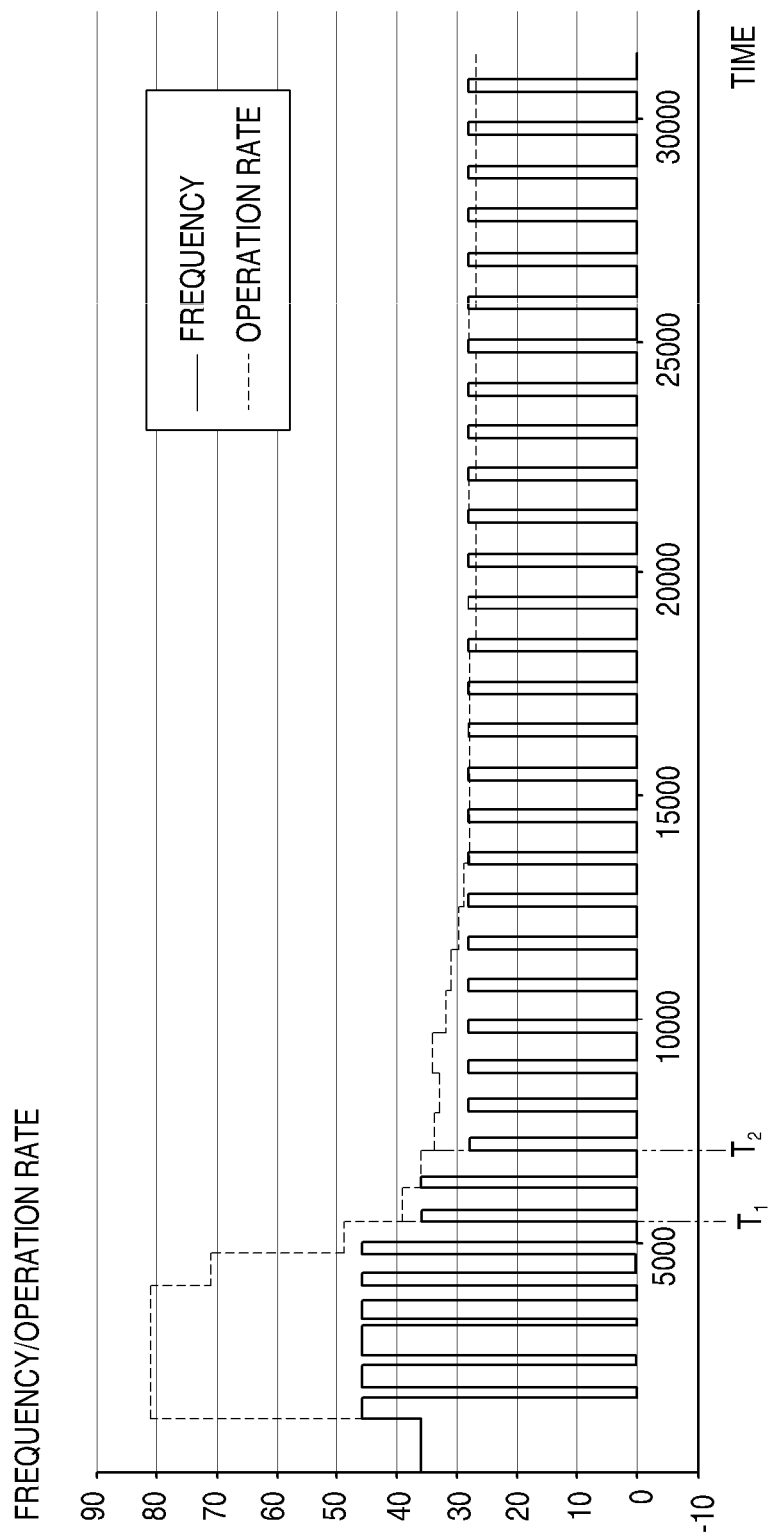
FIG. 22 is a graph depicting changes in a frequency and an operation rate when the compressor according to another embodiment of the present disclosure is continuously operated.

FIG. 22 is a graph depicting changes in a frequency and an operation rate when the compressor according to another embodiment of the present disclosure is continuously operated.

A continuous operation state of the compressor 50 will be described with reference to the accompanying drawing. When the load in the refrigerator 1 is input, as the operation rate increases, the frequency of the compressor 50 also increases, so that the compressor 50 is operated at the high speed.

The compressor 50 is operated at the high speed until the temperature in the refrigerator 1 is satisfied, and is continuously operated at the high speed due to the high operation rate. The cooling power is consistently and maximally supplied to the interior of the refrigerator 1 due to the continuous high-speed operation, and thus, the operation rate gradually decreases.

The cooling power may be sufficiently provided to the interior of the refrigerator 1 due to the consistent high-speed operation, and as a result, the operation rate of the compressor 50 at a time point T1 may be smaller than the fourth setting operation rate (for example, 40%). Thus, the frequency of the compressor 50 is decreased by one stage in a next operation cycle, so that the compressor 50 is operated at the middle speed.

Further, when the cooling power may be sufficiently provided even in the middle speed operation, the operation rate of the compressor 50 may be smaller than the first setting operation rate (for example, 40%). Thus, the frequency of the compressor 50 is decreased by one stage in another operation cycle, so that the compressor 50 is operated at the low speed.

Further, when a separate load is not supplied in a state in which the interior of the refrigerator 1 is consistently cooled in the low speed operation, the cooling power may be sufficiently supplied to the interior of the refrigerator 1, and the interior of the refrigerator may be stabilized. Further, as long as the operation rate is not less than the third setting operation rate (for example, 80%) in the low speed operation state, the low speed operation state is maintained.

Meanwhile, FIG. 22 is a graph when the setting of the cooling power is not changed, and the setting of the cooling power may be changed by a user while the refrigerator 1 is used.

In the embodiment of the present disclosure, the user rotates the manipulation member 211 to adjust an ON/OFF temperature of the thermostat 30 so as to adjust a set cooling power. Hereinafter, for convenience of understanding and description, a case where a "strong" mode, a "proper" mode, and a "weak" mode are set is described as an example. However, the present disclosure is not limited thereto, and a plurality of stages including the three stages may be configured.

Figure 23:
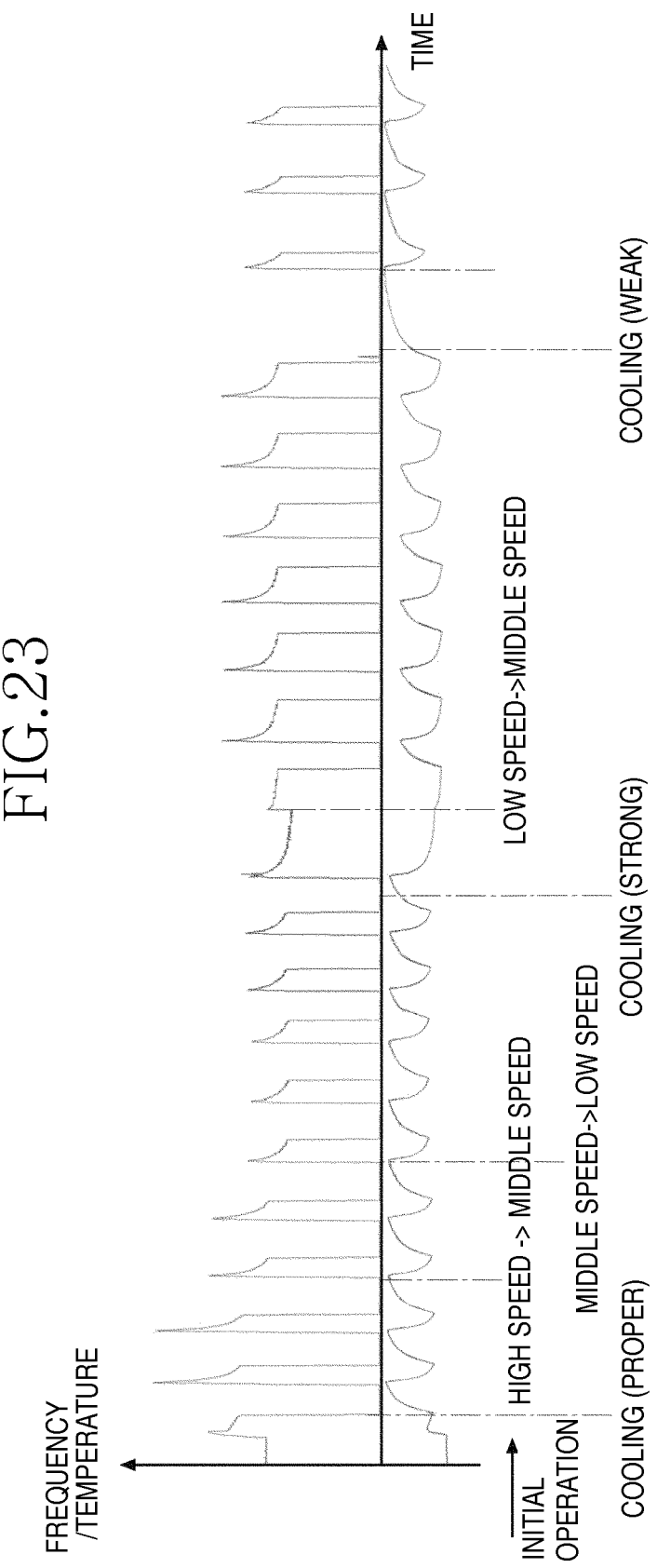
FIG. 23 is a graph depicting changes in a frequency and a temperature depending on a change of setting of a cooling power when the compressor according to another embodiment of the present disclosure is initially operated.

FIG. 23 is a graph depicting changes in a frequency and a temperature depending on a change of setting of a cooling power when the compressor according to another embodiment of the present disclosure is initially operated.

As illustrated in the drawing, after the initial operation is terminated, when the setting of the cooling power by the user is the proper mode, the compressor 50 is operated at the high speed to satisfy the temperature in the refrigerator.

When the high speed operation is performed during two cycles so that the cooling power is sufficiently supplied to the interior of the refrigerator 1, the operation rate calculated by the microcomputer 441 is not more than the fourth setting operation rate as described above, so that the middle speed operation may be performed.

Further, when the cooling power is sufficiently supplied even after the middle speed operation is performed for two cycles, the operation rate calculated by the microcomputer 441 is not more than the first setting operation rate as described above, the low speed operation is repeatedly performed.

In a state in which the low speed operation is consistently performed so that the interior of the refrigerator 1 is stabilized, the cooling power may be set to the strong mode by manipulation by the user. When the cooling power is set to the strong mode, the cooling power may be insufficient in the interior of the refrigerator 1. Thus, because the compressor 50 is not switched off and is consistently operated at the low speed after the cooling power is set to the strong mode, the microcomputer 441 may not calculate the operation rate. Thus, when a continuous operation tie of the compressor 50, which is integrated by the microcomputer 441, exceeds the second setting time, the frequency increases in a state in which the compressor 50 is switched on, and thus, a current state is switched to the middle speed operation. Thereafter, when the cooling power of the interior of the refrigerator 1 may be maintained at the strong mode, the compressor 50 is repeatedly operated at the middle speed.

In this state, the cooling power may be set to the weak mode by manipulation by the user. When the cooling power is set to the weak mode, the cooling power has been sufficiently provided to the interior of the refrigerator 1 by the previous middle speed operation. Thus, because the operation rate calculated by the microcomputer 441 is not more than the first setting operation rate, the operation frequency of the compressor 50 decreases, so that the current state may be switched to the low speed operation. Thereafter, when the cooling power of the interior of the refrigerator 1 may be maintained at the weak mode, the compressor 50 is repeatedly operated at the low speed.

In this way, even when the setting of the cooling power is changed by the manipulation by the user or the load increases/decreases, the compressor 50 is operated in a state in which the frequency of the compressor 50 is increased/ decreased by one stage based on the previous operation frequency according to the operation rate calculated by the microcomputer 441 or the integrated ON time of the compressor 50. Due to such operation, the compressor 50 may be operated while power consumption is more improved.

Figure 24:
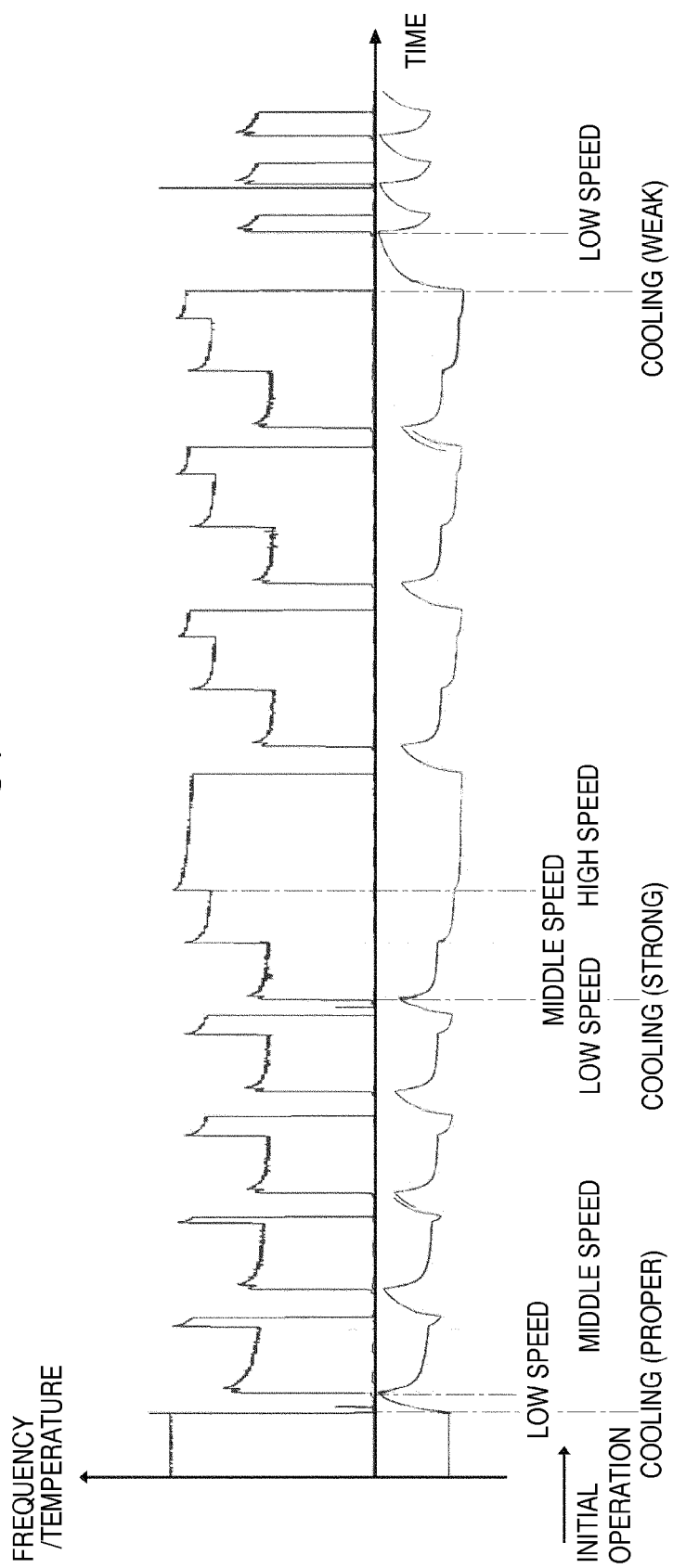
FIG. 24 is a graph depicting changes in a frequency and a temperature when a compressor according to yet another embodiment of the present disclosure is sequentially operated.

FIG. 24 is a graph depicting changes in a frequency and a temperature when a compressor according to yet another embodiment of the present disclosure is sequentially operated.

As illustrated in the drawing, when the cooling power is set to the proper mode by the user in a state in which the initial operation is terminated, the compressor 50 according to yet another embodiment of the present disclosure is operated at the low speed at the lowest frequency for a predetermined period of time, and is then operated at the middle speed. Here, the temperature in the refrigerator 1 is satisfied, one cycle is terminated. Further, even in the next cycle, the low speed operation and the middle speed operation are performed again in a sequence of the low speed operation and the middle speed operation. Thereafter, such sequential frequency change operation is repeatedly performed.

Further, when the cooling power is set to the strong mode by the user, the low speed operation and the middle speed operation are performed for a predetermined period of time, and the high speed operation is then performed. When the temperature in the refrigerator 1 is satisfied, one cycle is terminated. Further, likewise, even in the next cycle, the frequency change operation is sequentially performed in a sequence of the low speed operation to the high speed operation.

Next, when the cooling power is set to the weak mode by the user, the sufficient cooling power has been already provided to the interior of the refrigerator 1 in the previous strong mode. Thus, the temperature in the refrigerator 1 may be satisfied only by the initial low speed operation. Accordingly, the compressor 50 is repeatedly operated only at the low speed.

That is, in yet another embodiment of the present disclosure, when the compressor 50 is driven, the compressor 50 unconditionally starts to be operated at the low speed regardless of the load or the cooling power in the refrigerator 1, and may be operated while the frequency sequentially increases in one cycle until the temperature of the refrigerator is satisfied.

When the operations of the compressor 50 according to another embodiment and yet another embodiment of the present disclosure are compared with each other through FIGS. 23 and 24, power consumption of FIG. 23, that is, an area of a frequency region when the compressor 50 is operated, is remarkably low as compared with FIG. 24. Thus, it can be identified that the power consumption is excellent. Thus, the operation rate operation according to another embodiment of the present disclosure is more efficient in terms of power consumption.

FIG. 25 is a graph depicting a change in a frequency when the compressor according to another embodiment of the present disclosure is operated at power recovery.

As illustrated in the drawing, when electric power is supplied to the compressor 50 again after power failure, which is like the initial operation, the microcomputer 441 is reset, and thus data on the previous operation rate cannot be identified. Accordingly, in this case, as in the initial operation, after the electric power is resupplied, the compressor 50 is maintained in an OFF state for a predetermined period of time to prevent a damage to the compressor 50 by fire. Thereafter, the compressor 50 starts to be operated at the middle frequency, that is, at the middle speed, and after a plurality of cycles, the continuous operation based on the operation rate is performed.

In detail, in a state in which the compressor 50 is operated at the high speed at the high frequency, when the power failure occurs, and thus the electric power is blocked and is then supplied in turn, the microcomputer 441 is reset, and thus data on the previous operation rate cannot be identified.

In this state, when a delay time elapses after the electric power is supplied, the compressor starts to be operated at the middle speed by a signal set as default in the microcomputer 441. After the middle speed operation is performed during two cycles, the microcomputer 441 calculates the operation rate. Here, the operation rate will be higher than the second setting operation rate on the basis of the cooling power required in the previous high speed operation. Thus, the microcomputer 441 may perform a control such that the operation frequency of the compressor 50 increases so that the compressor 50 is operated at the high speed.

Further, in a state in which the compressor 50 is operated at the middle speed, the electric power is resupplied after power failure, the microcomputer 441 allows the compressor 50 to starts to be operated at the middle speed after the delay time elapses. When the microcomputer 441 calculates the operation rate after the middle speed operation is performed during two cycles, the operation rate may be a value between the first setting operation rate and the second setting operation rate due to an influence on the cooling power required in the previous middle speed operation. Thus, the microcomputer 441 may perform a control such that the compressor 50 is operated at the middle speed without changing the operation frequency of the compressor 50 later.

Further, in a state in which the compressor 50 is operated at the low speed, the electric power is resupplied after power failure, the microcomputer 441 allows the compressor 50 to starts to be operated at the middle speed after the delay time elapses. When the microcomputer calculates the operation rate after the middle speed operation is performed during two cycles, the required cooling power of the interior of the refrigerator 1 may not be satisfied due to an influence on delay of the delay time regardless the middle speed operation during two cycles. In this case, as the middle speed operation is additionally performed during one cycle, the required cooling power may be satisfied.

Next, the operation rate is recalculated through the two cycles of the last middle speed operation, and when the operation rate is not more than the first setting operation rate, the microcomputer 441 may perform a control to decrease the operation frequency of the compressor 50 later to allow the compressor 50 to be operated at the low speed.

In this way, even when the electric power is resupplied after power failure, the middle speed operation which is like the initial operation starts. Thereafter, the operation of the compressor 50 is controlled by varying the frequency according to the operation rate calculated by the microcomputer 441.

According to an embodiment of the present disclosure, because energy efficiency may be improved and manufacturing costs may be reduced, industrial availability is high.

What is claimed is:

1. A refrigerator comprising:
 a compressor having a rotation per minute (RPM) which is variably adjustable by adjusting a frequency;
 an evaporator configured to receive a refrigerant compressed by the compressor after being condensed and expanded, and to exchange heat with air in a storage space;

a thermostat configured to switch on or off depending on a temperature of the storage space cooled by the evaporator; and a compressor printed circuit board (PCB) configured to drive the compressor according to an ON or OFF state of the thermostat, wherein the compressor PCB comprises:

a thermostat recognition unit connected to the thermostat to receive an ON or OFF signal of the thermostat; and a microcomputer configured to integrate and store an operation time and a stop time of the compressor during a cycle from a first time point at which the compressor starts operating to a second time point at which the compressor restarts operating after having stopped between the first time point and the second time point, and calculate an operation rate, and wherein the microcomputer is connected to the thermostat recognition unit to calculate the operation rate according to an ON or OFF signal of the thermostat recognition unit, and adjust the frequency of the compressor based on the calculated operation rate.

2. The refrigerator of claim 1, wherein the thermostat recognition unit comprises a pulse conversion circuit connected to the thermostat to convert a sinusoidal signal of the thermostat into a pulse signal when the thermostat is switched on.

3. The refrigerator of claim 1, wherein the thermostat recognition unit comprises a photo coupler connected to the thermostat to transfer the ON or OFF signal of the thermostat to the microcomputer in an insulated state.

4. The refrigerator of claim 1, wherein the microcomputer is configured to initialize the operation rate when electric power is initially supplied to the refrigerator or is resupplied to the refrigerator after the refrigerator is switched off, and is configured to supply a middle frequency signal to the compressor to operate the compressor in a middle speed operation.

5. The refrigerator of claim 4, wherein the microcomputer is configured to, when electric power is initially supplied to the refrigerator or is resupplied to the refrigerator after the refrigerator is switched off, maintain an OFF state of the compressor for a set delay time, and then start operating the compressor in the middle speed operation.

6. The refrigerator of claim 4, wherein the middle speed operation, which is performed when electric power is initially supplied to the refrigerator or is resupplied to the refrigerator after the refrigerator is switched off, is continuously performed for a set period of time.

7. The refrigerator of claim 1, wherein the microcomputer is configured to perform a control such that the frequency of the compressor is maintained to be equal to a frequency of a previous cycle or is increased or decreased from the frequency of the previous cycle in stages, based on the operation rate.

8. The refrigerator of claim 1, wherein the microcomputer is configured to maintain the frequency of the compressor to be equal to a frequency of a previous cycle when the operation rate is within a set range, and increase or decrease the frequency of the compressor by one stage from the frequency of the previous cycle when the operation rate is not less than or not more than the set range.

9. The refrigerator of claim 8, wherein the microcomputer is configured to control the compressor to be operated in any one of a high speed operation in which the frequency of the compressor is highest, a low speed operation in which the frequency of the compressor is lowest, and a middle speed operation in which the frequency of the compressor is between the frequency of the high speed operation and the frequency of the low speed operation.

10. The refrigerator of claim 1, wherein the operation rate is obtained by dividing, by the operation time of the compressor, an integrated time of the operation time and stop time of the compressor in a plurality of previous cycles.

11. The refrigerator of claim 1, wherein the microcomputer is configured to increase the frequency of the compressor being operated by one stage when a time for which the compressor is continuously operated exceeds a set time.

12. The refrigerator of claim 1, wherein the evaporator is formed to define an accommodation space.

13. The refrigerator of claim 12, wherein the evaporator is accommodated in a body, and wherein the body comprises:

a freezing chamber formed by bending the evaporator, and providing an independent space in the body; and a refrigerating chamber defining an outer space of the evaporator and located below the evaporator.

14. The refrigerator of claim 13, wherein the thermostat is mounted on a lower surface of the evaporator.

15. The refrigerator of claim 13, wherein a manipulation member connected to the thermostat is provided in the body, and wherein the manipulation member is configured to adjust an ON or OFF distance of the thermostat according to a manipulation of the manipulation member so as to adjust a cooling power in the refrigerator.

16. The refrigerator of claim 12, wherein the accommodation space comprises the storage space.

17. The refrigerator of claim 1, wherein the thermostat comprises:

a refrigerant tube filled with a refrigerant expanded depending on a temperature;

a fixing bracket configured to fix one end of the refrigerant tube such that the one end is in contact with the evaporator;

a bellows communicating with the refrigerant tube and having an elastic member accommodated therein; and a switch switched on or off by the bellows.

18. The refrigerator of claim 1, wherein the compressor PCB comprises:

a noise filter configured to remove noise in input electric power;

a power supply unit configured to convert input alternating current (AC) electric power into direct current (DC) electric power and supply the converted DC electric power; and a compressor operation unit configured to drive the compressor according to the electric power of the power supply unit and the frequency determined by the microcomputer for inverter driving.

19. The refrigerator of claim 1, wherein the compressor PCB is provided inside a machine room in which the compressor is provided.

* * * * *